United States Patent
Zhu et al.

(10) Patent No.: US 8,391,377 B2
(45) Date of Patent: Mar. 5, 2013

(54) ACTIVE ANTENNA, BASE STATION, METHOD FOR REFRESHING AMPLITUDES AND PHASES, AND METHOD FOR PROCESSING SIGNALS

(75) Inventors: Yuanrong Zhu, Shenzhen (CN); Jianjun Chen, Shenzhen (CN); Zhubiao He, Shenzhen (CN); Jianfeng Wu, Shenzhen (CN); Ming Xu, Shenzhen (CN); Yi Zhang, Shenzhen (CN); Yuntao Zhu, Shenzhen (CN); Pinghua He, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/026,914

(22) Filed: Feb. 14, 2011

(65) Prior Publication Data

US 2011/0134972 A1    Jun. 9, 2011

Related U.S. Application Data

(63) Continuation of application No. PCT/CN2009/070866, filed on Mar. 18, 2009.

(30) Foreign Application Priority Data

Aug. 14, 2008    (CN) .......................... 2008 1 0145754

(51) Int. Cl.
    *H04L 27/00*    (2006.01)
(52) U.S. Cl. .................... 375/259; 375/285; 375/296
(58) Field of Classification Search .................. 375/219, 375/224, 226, 259–260, 285, 296, 346, 371, 375/377
See application file for complete search history.

(56) References Cited

U.S. PATENT DOCUMENTS 5,826,180 A * 10/1998 Golan ........................... 455/302
6,943,627 B2    9/2005 Leyonhjelm et al.
(Continued)

FOREIGN PATENT DOCUMENTS

| CN | 1399480 A | 2/2003 |
| CN | 1489844 A | 4/2004 |

(Continued)

OTHER PUBLICATIONS

Extended European Search Report in corresponding European Application No. 09806309.2 (Jul. 1, 2011).

(Continued)

*Primary Examiner* — Jean B Corrielus
(74) *Attorney, Agent, or Firm* — Leydig, Voit & Mayer, Ltd.

(57) ABSTRACT

An active antenna, a base station, a method for refreshing the amplitude and phase, and a signal processing method are disclosed to simplify the structure of a phase shifter and guarantee the reliability of the phase shifter. The active antenna or the base station includes an antenna dipole array, a transceiver array, a digital processing unit (DPU), and a transceiving calibration unit. During signal reception, the transceiver demodulates a radio frequency (RF) signal of the antenna dipole into an IQ analog signal, and outputs the IQ analog signal to the DPU; the DPU converts the demodulated IQ analog signal into an IQ digital signal, and performs digital beam forming (DBF) on the IQ digital signal according to the transceiving calibration unit; during signal transmission, the transceiver modulates the IQ analog signal of the DPU into an RF signal, and outputs the RF signal to the antenna dipole; the DPU converts a signal of a base band unit (BBU) into an IQ digital signal in serial/parallel (S/P) mode, and performs DBF on the IQ digital signal according to the transceiving calibration unit.

15 Claims, 15 Drawing Sheets

U.S. PATENT DOCUMENTS

| | | | |
|---|---|---|---|
| 6,996,418 B2 * | 2/2006 | Teo et al. | 455/562.1 |
| 2004/0012387 A1 | 1/2004 | Shattil | |
| 2005/0078763 A1 * | 4/2005 | Choi et al. | 375/267 |
| 2006/0128310 A1 | 6/2006 | Leabman | |
| 2006/0291549 A1 * | 12/2006 | Seppinen et al. | 375/227 |
| 2008/0095039 A1 | 4/2008 | Joo et al. | |
| 2010/0183090 A1 * | 7/2010 | Abbasfar et al. | 375/296 |
| 2010/0232483 A1 * | 9/2010 | Zhang et al. | 375/219 |

FOREIGN PATENT DOCUMENTS

| | | |
|---|---|---|
| CN | 1492715 A | 4/2004 |
| CN | 1503587 A | 6/2004 |
| CN | 1784813 A | 6/2006 |
| CN | 101124732 A | 2/2008 |
| EP | 0901184 A1 | 3/1999 |
| WO | WO 2004097987 A1 | 11/2004 |

OTHER PUBLICATIONS

Written Opinion of the International Searching Authority in corresponding PCT Application No. PCT/CN/2009/070866 (Jun. 18, 2009).

International Search Report in corresponding PCT Application No. PCT/CN2009/070866 (Jun. 18, 2009).

1st Office Action in corresponding Chinese Patent Application No. 200810145754.0 (Mar. 30, 2012).

Search Report in corresponding Chinese Patent Application No. 200810145754.0 (Oct. 30, 2012).

\* cited by examiner

ACTIVE ANTENNA, BASE STATION, METHOD FOR REFRESHING AMPLITUDES AND PHASES, AND METHOD FOR PROCESSING SIGNALS

CROSS-REFERENCE TO RELATED APPLICATIONS

This application is a continuation of International Application No. PCT/CN2009/070866, filed on Mar. 18, 2009, which claims priority to Chinese Patent Application No. 200810145754.0, filed on Aug. 14, 2008, both of which are hereby incorporated by reference in their entireties.

FIELD OF THE INVENTION

The present invention relates to the mobile communication field, and in particular, to an active antenna, a Base Station, a method for refreshing amplitudes and phases, and a method for processing signals.

BACKGROUND

In mobile communication systems, a tower mounted antenna unit is generally used to receive and transmit signals. Because the antenna unit is usually passive, a radio remote unit (RRU) needs to provide a high power transmission signal, and this signal is transmitted by an antenna unit connected to the RRU via a feeder cable.

As shown in FIG. 1, the antenna unit in the prior art includes an antenna dipole array 5, a phase shifter network and power combiner/splitter network 6, a multiplexer and demultiplexer circuit module (BiasTee) 9, a transmission unit 7, and a remote control unit (RCU) 8. The RRU includes a transceiver and a digital processing unit (DPU). The RRU is connected to the antenna unit via a feeder line. During signal reception, a weak electromagnetic wave signal transmitted by a mobile station is received by the antenna dipole array 5; this weak signal is phase-shifted by the phase shifter network, and is combined into a received signal by the power combiner/splitter network; the multiplexer and demultiplexer circuit module 9 transmits the received signal to the RRU through the feeder line; the received signal is processed by the duplexer, low-noise amplifier (LNA) and down-converter of the transceiver on the RRU, and undergoes the analog-to-digital conversion (ADC) and filtering (cascaded integral comb (CIC) decimation filter, half band filter (HBF), and finite impulse response filter (FIR)) by the DPU on the RRU; the received signal is sent to the base band unit (BBU), and then to the base station controller (BSC) through the BBU. During signal emission, the signal of the BBU undergoes the clipping of clipper (crest factor reduction (CFR)) and digital-to-analog conversion (DAC) by the DPU on the RRU; the signal is then processed by the transceiver (frequency conversion), power amplifier (PA), and duplexer on the RRU; the signal is transmitted to the phase shifter network and power combiner/splitter network through the feeder line and the multiplexer and demultiplexer circuit module 9; the signal is split into multiple signals by the power combiner/splitter network; the signals reach the antenna dipole array; the antenna dipole array converts the signals into electromagnetic wave signals, and transmits them to the mobile station.

The phase shifter network is designed in a motor-driven mechanical structure; the multiplexer and demultiplexer circuit module 9 extracts the DC power supply and control signaling needed by the RCU 8 from the feeder line; the RCU 8 controls the transmission unit 7, and enables the phase shifter network to adjust the amplitude and phase of each antenna dipole.

During the implementation of the present invention, the inventor discovers at least the following problems in the prior art:

The phase shifter network adopts a complex mechanical structure and is unreliable in the process of adjusting the amplitudes and phases of the antenna dipoles.

SUMMARY OF THE INVENTION

Embodiments of the present invention provide an active antenna or a Base Station to resolve the complex mechanical structure and uncertainty of a phase shifter network.

An active antenna includes an antenna dipole array, a transceiver array, and a DPU.

The antenna dipole array includes an antenna dipole adapted to perform conversion between an electromagnetic wave signal and a radio frequency (RF) signal.

The transceiver array includes a transceiver adapted to: during signal reception, demodulate the RF signal of the antenna dipole into an IQ analog signal through down-conversion, and output the IQ analog signal to the DPU; during signal transmission, modulate the IQ analog signal of the DPU into an RF signal through up-conversion, and output the RF signal to the antenna dipole.

The DPU is adapted to: during signal reception, convert the down-converted IQ analog signal into an IQ digital signal, and perform digital beam forming (DBF) on the IQ digital signal; during signal transmission, convert the signal of a BBU into an IQ digital signal through serial/parallel (S/P) conversion, perform CFR on the serial/parallel converted IQ digital signal, and perform DBF on the IQ digital signal that undergoes the CFR processing.

A method for refreshing the amplitude and phase of a receiving channel includes:

selecting a receiving channel;

converting a received calibration IQ digital signal into an IQ analog signal that enters a receiving calibration channel, and modulating the IQ analog signal into a received calibration RF signal through up-conversion;

coupling the received calibration RF signal into the selected receiving channel, and demodulating the received calibration RF signal into an IQ analog signal through down-conversion; converting the IQ analog signal into an IQ digital signal, comparing the IQ digital signal with the received calibration IQ digital signal, and obtaining the amplitude and phase of the selected receiving channel; and refreshing the amplitude and phase of the selected receiving channel according to the amplitude and phase.

A method for refreshing the amplitude and phase of a transmission channel includes:

selecting a transmission channel;

collecting an IQ digital signal;

converting the IQ digital signal into an IQ analog signal that enters the selected transmission channel, and modulating the IQ analog signal into an RF signal through up-conversion;

coupling the RF signal into a transmission calibration channel, and demodulating the RF signal into an IQ analog signal through down-conversion;

converting the IQ analog signal into an IQ digital signal, comparing the collected IQ digital signal with the converted IQ digital signal, and obtaining the amplitude and phase of the selected transmission channel; and refreshing the amplitude and phase of the selected transmission channel according to the amplitude and phase of the selected transmission channel.

A mode-based or carrier-based processing method for received signals includes:

converting the IQ analog signals of M receiving channels into M IQ digital signals, and splitting each IQ digital signal into N single-mode received signals or N single-carrier received signals through N mode-based or carrier-based numerical control oscillators (NCOs);

performing DBF on each N single-mode received signals or each N single-carrier received signals in M receiving channels;

combining single-mode received signals in M receiving channels in each N single-mode received signals or single-carrier received signals in M receiving channels in each N single-carrier received signals through a combiner, and processing the combined signal through a filter processing module, and obtaining N IQ digital signals; and combining the N IQ digital signals into a signal through the combiner, and transmitting the signal to the BBU.

A mode-based or carrier-based processing method for transmitting signals includes:

converting a transmission signal through serial-parallel conversion, and obtaining N IQ digital signals, processing each IQ digital signal of the N IQ digital signals through a mode-based or carrier-based NCO, and obtaining each single-mode transmission IQ digital signal or each single-carrier transmission IQ digital signal;

processing each single-mode transmission IQ digital signal of the N IQ digital signals or each single-carrier transmission IQ digital signal of the N IQ digital signals through M DBFs, and obtaining M mode-based or carrier-based IQ digital signals;

combining N single-mode transmission IQ digital signals in each M transmission channels or N single-carrier transmission IQ digital signals in each M transmission channels into a signal through a combiner, and obtaining M mode-based or carrier-based mixture transmission signals; and performing CFR and digital pre-distortion (DPD) on the M mode-based or carrier-based mixture transmission signals, converting the M mode-based or carrier-based mixture transmission signals into IQ analog signals, and outputting the IQ analog signals to each transmission channel of the transceiver.

A Base Station includes an antenna dipole array, a transceiver array, and a DPU.

The antenna dipole array includes an antenna dipole adapted to perform conversion between an electromagnetic wave signal and an RF signal.

The transceiver array includes a transceiver adapted to: during signal reception, demodulate the RF signal of the antenna dipole into an IQ analog signal through down-conversion, and output the IQ analog signal to the DPU; during signal transmission, modulate the IQ analog signal of the DPU into an RF signal through up-conversion, and output the RF signal to the antenna dipole.

The DPU is adapted to: during signal reception, convert the down-converted IQ analog signal into an IQ digital signal, and perform DBF on the IQ digital signal; during signal transmission, convert the signal of the BBU into an IQ digital signal through serial-parallel conversion, and perform DBF on the serial-parallel converted IQ digital signal.

According to the technical solution provided in embodiments of the present invention, on the active antenna or Base Station, during signal reception, the DPU performs DBF on the IQ digital signal; during signal transmission, the DPU performs DBF on the IQ digital signal converted through serial-parallel conversion. In this way, the complex structure and uncertainty of the phase shifter network can be avoided.

BRIEF DESCRIPTION OF THE DRAWINGS

To make the technical solution in the present invention or in the prior art clearer, the accompanying drawings for illustrating the embodiments of the present invention or the prior art are given below. Apparently, the accompanying drawings are exemplary only, and those skilled in the art can derive other drawings from such accompanying drawings without creative efforts.

DETAILED DESCRIPTION OF THE INVENTION

The technical solution under the present invention is expounded below with reference to the accompanying drawings. Apparently, the embodiments described below are exemplary only, without covering all embodiments of the present invention. Persons having ordinary skill in the art can derive other embodiments from the embodiments given herein without making any creative effort, and all such embodiments are covered in the scope of the present invention.

Embodiment 1

Figure 1:
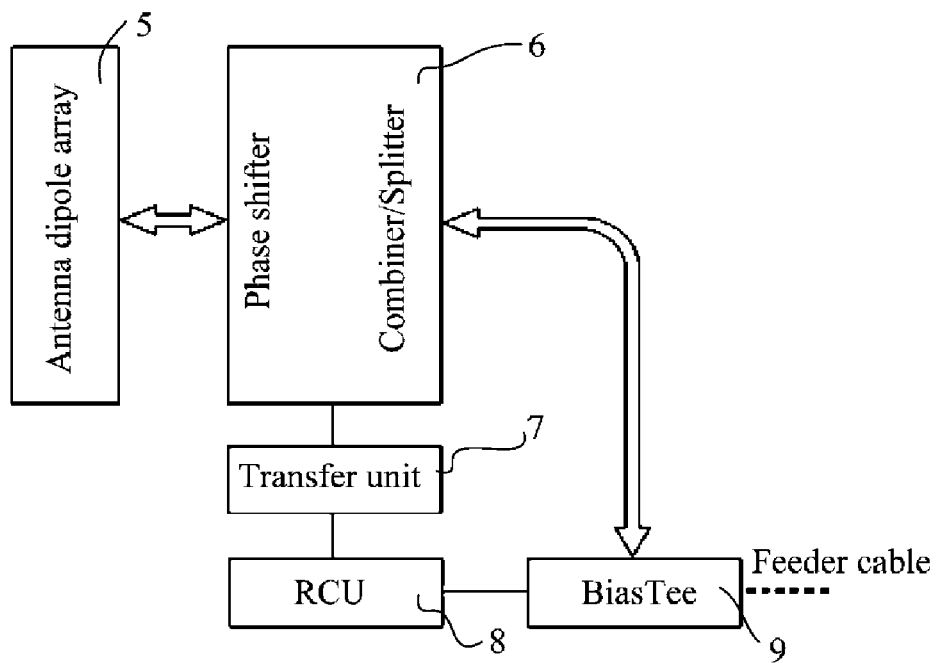
FIG. 1 shows a structure of an antenna unit in the prior art.
Figure 2:
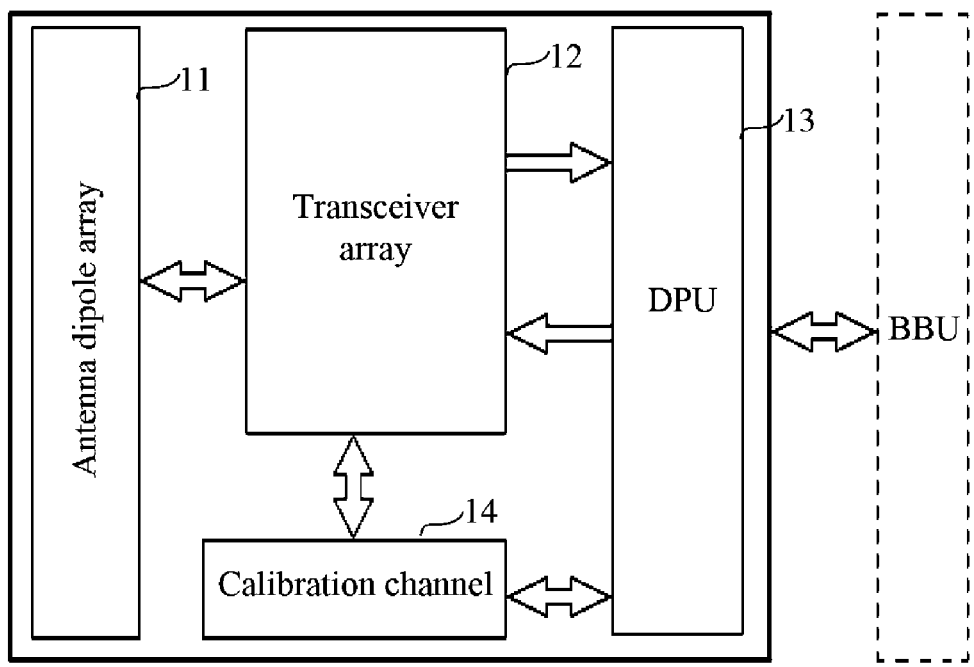
FIG. 2 shows a structure of an active antenna or a base station according to an embodiment of the present invention.

FIG. 2 shows a structure of an active antenna or a base station in the first embodiment of the present invention. The active antenna includes an antenna dipole array 11, a transceiver array 12, a digital processing unit (DPU) 13, and a transceiving calibration unit 14.

The antenna dipole array 11 includes an antenna dipole adapted to perform conversion between an electromagnetic wave signal and an RF signal.

The transceiver array 12 includes a transceiver adapted to: during signal reception, demodulate the RF signal of the antenna dipole into an IQ analog signal, and output the IQ analog signal to the DPU 13; during signal transmission, modulate the IQ analog signal of the DPU 13 into an RF signal through up-conversion, and output the RF signal to the antenna dipole.

The DPU 13 is adapted to: during signal reception, convert the down-converted IQ analog signal into an IQ digital signal, and perform DBF on the IQ digital signal according to the transceiving calibration unit; during signal transmission, convert the signal of a base band unit (BBU) into an IQ digital signal through serial-parallel conversion, perform CFR on the converted IQ digital signal, and perform DBF on the IQ digital signal that undergoes the CFR processing according to the transceiving calibration unit.

In this embodiment, on the active antenna or the base station, during signal reception, the DPU performs DBF on the IQ digital signal according to the transceiving calibration unit; during signal transmission, the DPU performs DBF on the IQ digital signal converted through serial-parallel conversion according to the transceiving calibration unit. In this way, the amplitudes and phases for transmitting and receiving the RF signal are adjusted. Thereby, the complex structure and uncertainty of the phase shifter network can be avoided.

The transceiving calibration unit 14 is connected to the transceiver and the DPU 13 and adapted to: modulate the received calibration IQ analog signal in the DPU 13 into a received calibration RF signal through up-conversion, and demodulate the RF signal of the transceiver into a transmission calibration IQ analog signal through down-conversion.

The IQ signal is a dedicated signal in modern digital communication systems. A pulse sequence forms an in-phase signal (I signal) and a quadrature signal (Q signal) after the serial-parallel conversion. The I signal and Q signal are multiplied by two carrier waves that are orthogonal to each other (with the phase difference of 90 degrees) respectively so as to be modulated. Thus, the I signal and Q signal do not interfere with each other in the information modulation. After the modulated signals are combined, the occupied frequency band is still the frequency band occupied by a signal, thus improving the utilization of the spectrum. The IQ signal includes an IQ analog signal and an IQ digital signal.

Figure 3A:
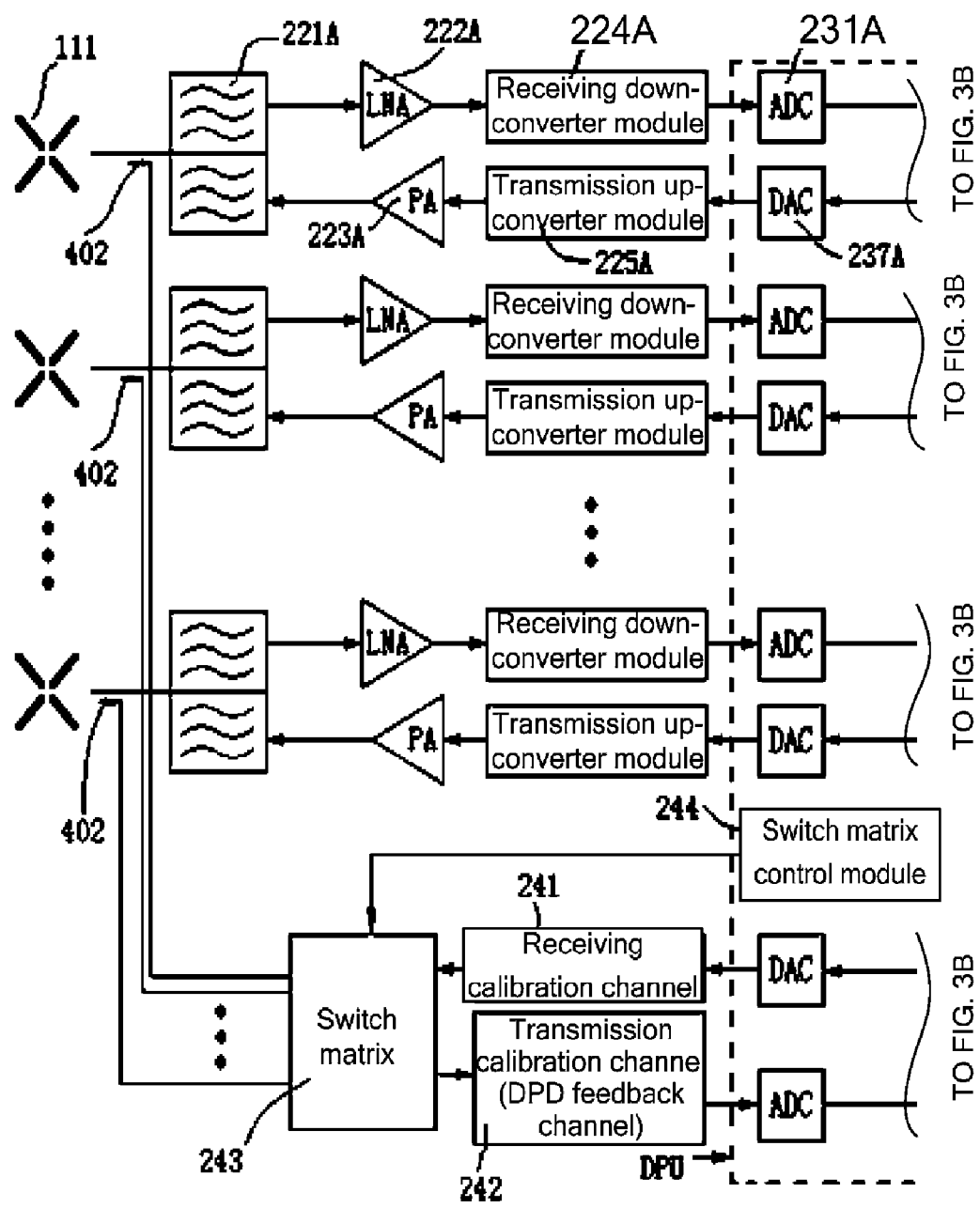
FIGS. 3A and 3B show a detailed structure of an active antenna or a base station according to an embodiment of the present invention.
Figure 3B:
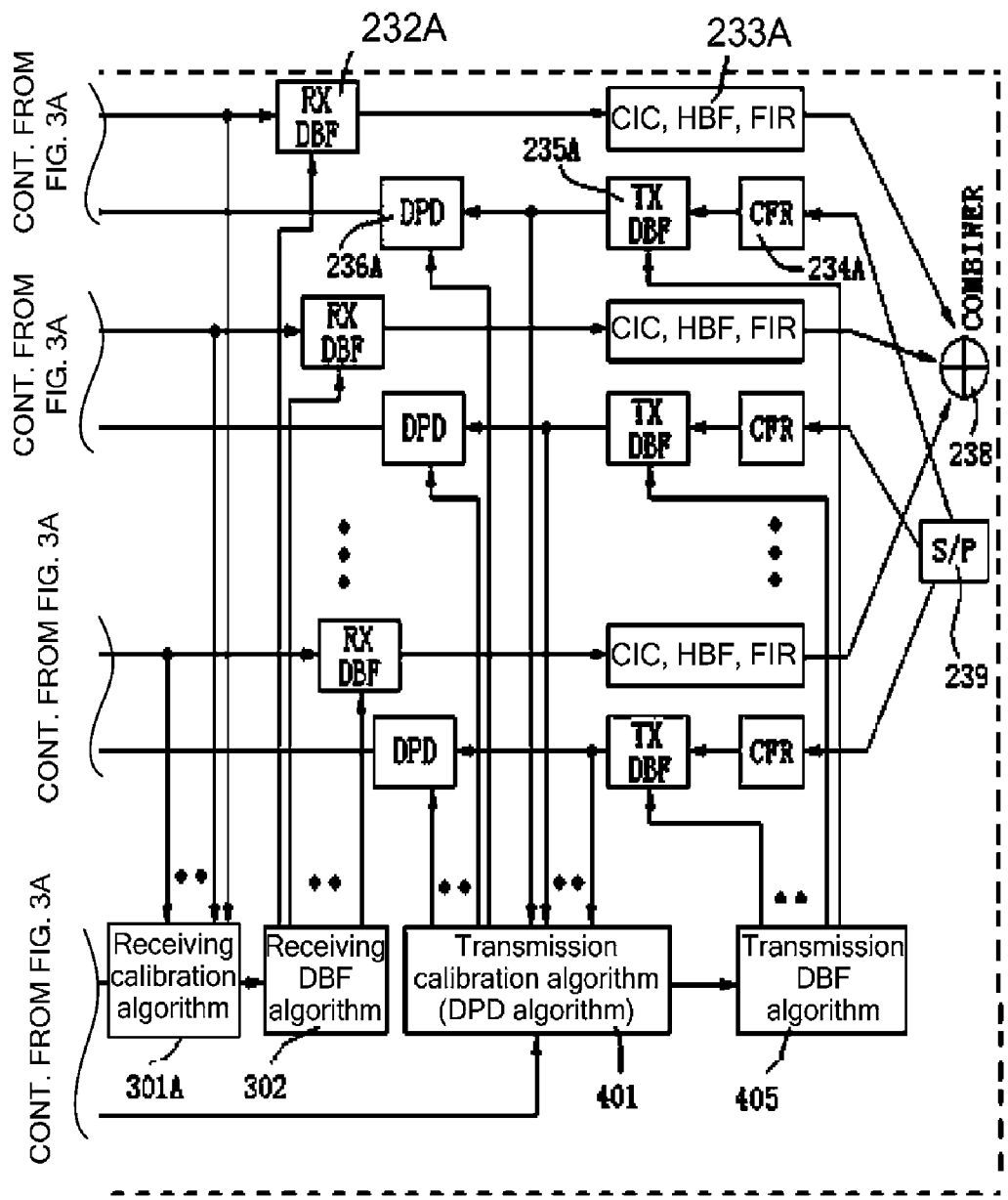

FIG. 3 shows a detailed structure of the active antenna or the base station in the first embodiment of the present invention. The antenna dipole array 11 includes an antenna dipole 111. The transceiver array 12 includes multiple transceivers. Each transceiver includes a duplexer 221A, an LNA 222A, a PA 223A, a receiving down-converter module 224A, and a transmission up-converter module 225A. The duplexer 221A, LNA 222A, and receiving down-converter module 224A of the transceiver may form a receiving channel. The duplexer 221A, PA 223A, and transmission up-converter module 225A of the transceiver may form a transmission channel. The receiving channel and transmission channel of the transceiver are connected to the antenna dipole 111.

A transceiver may include a receiving channel and a transmission channel. That is, a receiving channel and a transmission channel share a same antenna dipole through the duplexer. In the transceiver array, two receiving channels may correspond to a transmission channel, that is, one receiving channel and one transmission channel share the same antenna dipole through the duplexer, and the other receiving channel is connected to an antenna dipole vertical to the polarization direction of the shared antenna dipole through a receiving filter.

In this embodiment, the fact that the receiving channel and transmission channel include a duplexer 221A may be understood as follows: The receiving channel includes a receiving filter; and the transmission channel includes a transmission filter.

The receiving filter and the transmission filter may form a duplexer. In this case, the receiving channel and transmission channel may share the antenna dipole. When the receiving signal and the transmission signal do not share the antenna dipole, the receiving channel may include a receiving filter, an LNA, and a receiving down-converter module; the transmission channel may include a transmission filter, a PA, and a transmission up-converter module.

The following describes the functions of each module in the transceiver:

The duplexer 221A is adapted to: during signal transmission, ensure that the high-power RF signal transmitted from the PA 223A can reach the antenna dipole only and does not reach the LNA 222A through the duplexer 221A, which avoids burning or blocking of the LNA 222A; during signal reception, ensure that the weak RF signal that the antenna dipole 111 receives from the mobile station can reach the LNA 222A through the duplexer 221A.

The duplexer 221A may be a small surface mount medium duplexer or surface acoustic wave duplexer.

The LNA 222A is adapted to amplify the weak RF signal received from the antenna dipole 111.

The receiving sensitivity of the antenna largely depends on the loss of the line (connector, cable or other transmission lines) between the duplexer at the front end of the LNA 222A and the antenna dipole. Because the transceiver of the active antenna is directly connected to the antenna dipole 111, the loss is low. Thus, the noise coefficient of the receiving channel is reduced equivalently, that is, the receiving sensitivity of the antenna is improved.

The connection between the transceiver and the antenna dipole 111 may be as follows: the transceiver is integrated with the antenna dipole.

The PA 223A is adapted to amplify the low-power RF signal to be transmitted by the transmission up-converter module 225A.

The receiving down-converter module 224A is adapted to demodulate the RF signal output by the LNA 222A into an IQ analog signal through down-conversion.

The transmission up-converter module 225A is adapted to modulate the IQ analog signal of the DPU into an RF signal through up-conversion.

As shown in FIG. 3, the DPU 13 includes an ADC 231A, a DBF receiving module 232A, a filter processing module 233A, a combiner 238, an S/P converter 239 (S/P 239), a CFR 234A, a DBF transmitting module 235A, a DPD module 236A, and a DAC 237A. The ADC 231A, the DBF receiving module 232A, and the filter processing module 233A may form a receiving channel. The CFR 234A, the DBF transmitting module 235A, the DPD module 236A, and the DAC 237A may form a transmission channel. In this way, the DPU 13 includes the receiving channel, the transmission channel, the combiner 238, and the S/P 239. The receiving channel of the DPU 13 may be connected to the receiving channel of the transceiver, and the transmission channel of the DPU 13 may be connected to the transmission channel of the transceiver.

The receiving channel includes:

the ADC 231A, adapted to convert the received IQ analog signal into an IQ digital signal through ADC;

the DBF receiving module 232A, adapted to perform DBF on the IQ digital signal converted by the ADC 231A; and the filter processing module 233A, adapted to filter the IQ digital signal processed by the DBF receiving module 232A. The filter processing module 233A includes a cascaded integral comb (CIC) decimation filter, a half band filter (HBF), and a finite impulse response filter (FIR).

It should be noted that the receiving channel and transmission channel in the DPU 13 may be configured according to the number of transceivers in the transceiver array. That is, the receiving channel of one transceiver corresponds to one receiving channel, and the transmission channel of one transceiver corresponds to one transmission channel.

As shown in FIG. 3, in the receiving channel, the ADC 231A, the DBF receiving module 232A, and the filter processing module 233A may be connected in sequence according to the signal transmission direction. The IQ analog signal is converted into an IQ digital signal. The DBF receiving module 232A and the filter processing module 233A are adapted to process the IQ digital signal in the digital domain.

After each receiving channel in the DPU 13 processes the IQ analog signal, the combiner 238 accumulates the IQ digital signals of each receiving channel according to a related algorithm, and then transmits the combined signal to the BBU.

The related algorithm may be understood as follows: relevant signals may be extracted from multiple parallel signals, and irrelevant signals (for example, interference and noise signals) are eliminated.

The transmission channel includes:

the CFR 234A, adapted to perform crest factor reduction on the IQ digital signal that undergoes the S/P conversion;

the DBF transmitting module 235A, adapted to perform DBF on the IQ digital signal processed by the CFR 234A;

the DPD module 236A, adapted to perform digital predistortion on the IQ digital signal processed by the DBF transmitting module 235A to improve the non-linearity of the PA of the transmission channel in the transceiver and linearize the transmission channel in the transceiver; and the DAC 237A, adapted to convert the IQ digital signal processed by the DPD module 236A into an IQ analog signal through a DAC.

Thus, the signal generated by the BBU is converted into multiple transmission IQ digital signals by the S/P 239 firstly, and the signals then enter each transmission channel. In each transmission channel, the CFR 234A, the DBF transmitting module 235A, the DPD module 236A, and the DAC 237A are connected in sequence according to the signal transmission direction, and adapted to process the IQ digital signals in the digital domain.

It should be noted that when the PA in the transceiver has a good linearity, the transmission channel may not include the DPD module.

One transceiver may be integrated with the antenna dipole connected to the transceiver, the receiving channel and transmission channel in the DPU connected to the transceiver. Thus, on the active antenna in this embodiment, the quantity of modules may be increased or decreased according to the actual need, and the base station with various antenna gains may be configured flexibly.

As shown in FIG. 3, the DPU 13 of the active antenna further includes:

a receiving calibration algorithm module 301A, adapted to: generate a receiving calibration IQ digital signal; where when the IQ digital signal is converted into an IQ analog signal, the IQ digital signal enters a selected receiving channel through the transceiving calibration unit 14, and is demodulated into an IQ analog signal through down-conversion and then converted into an IQ digital signal; compare the converted IQ digital signal with the receiving calibration IQ digital signal, obtain the amplitude and phase of the selected receiving channel, and refresh the amplitude and phase of the selected receiving channel; when refreshing the amplitudes and phases of all the receiving channels, obtain a receiving amplitude and a phase value according to the amplitudes and phases of all the receiving channels, compare the receiving amplitude and the phase value with the amplitude and phase of each receiving channel, and obtain a receiving calibration factor of the amplitude and phase of each receiving channel;

a receiving DBF algorithm module 302, adapted to: configure the receiving calibration factor on the DBF receiving module 232A in each receiving channel, where the DBF receiving module 232A performs DBF on the IQ digital signal converted from the down-converted IQ analog signal;

a transmission calibration algorithm module 401, adapted to: collect an IQ digital signal; when the IQ digital signal is converted into an IQ analog signal, the IQ digital signal enters a selected transmission channel, and is modulated into an RF signal through up-conversion, whereupon the RF signal is collected by the transceiving calibration unit 14, and demodulated into an IQ analog signal; compare the IQ digital signal converted from the demodulated IQ analog signal with the collected IQ digital signal, obtain the amplitude and phase of the selected transmission channel, and refresh the amplitude and phase of the selected transmission channel; when refreshing the amplitudes and phases of all the transmission channels, obtain a transmission amplitude and a phase value, compare the transmission amplitude and the phase value with the amplitude and phase of each transmission channel, and obtain a transmission calibration factor of the amplitude and phase of each transmission channel;

a transmission DBF algorithm module 405, adapted to configure the transmission calibration factor on a DBF transmitting module 235A in each transmission channel; and the DBF transmitting module 235A, adapted to perform DBF on the IQ digital signal that undergoes the CFR processing.

Figure 4A:
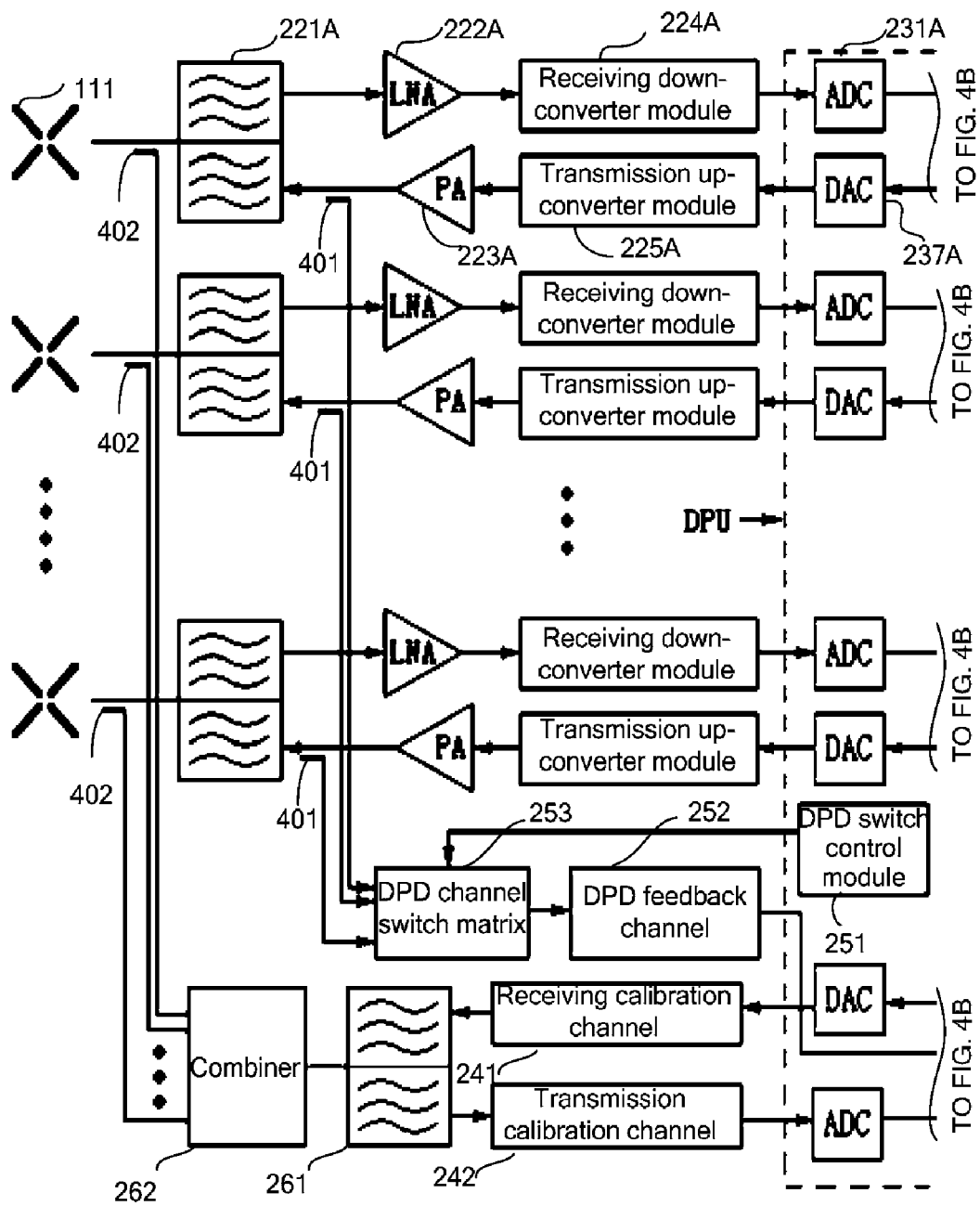
FIGS. 4A and 4B show a detailed structure of another active antenna or a base station according to an embodiment of the present invention.
Figure 4B:
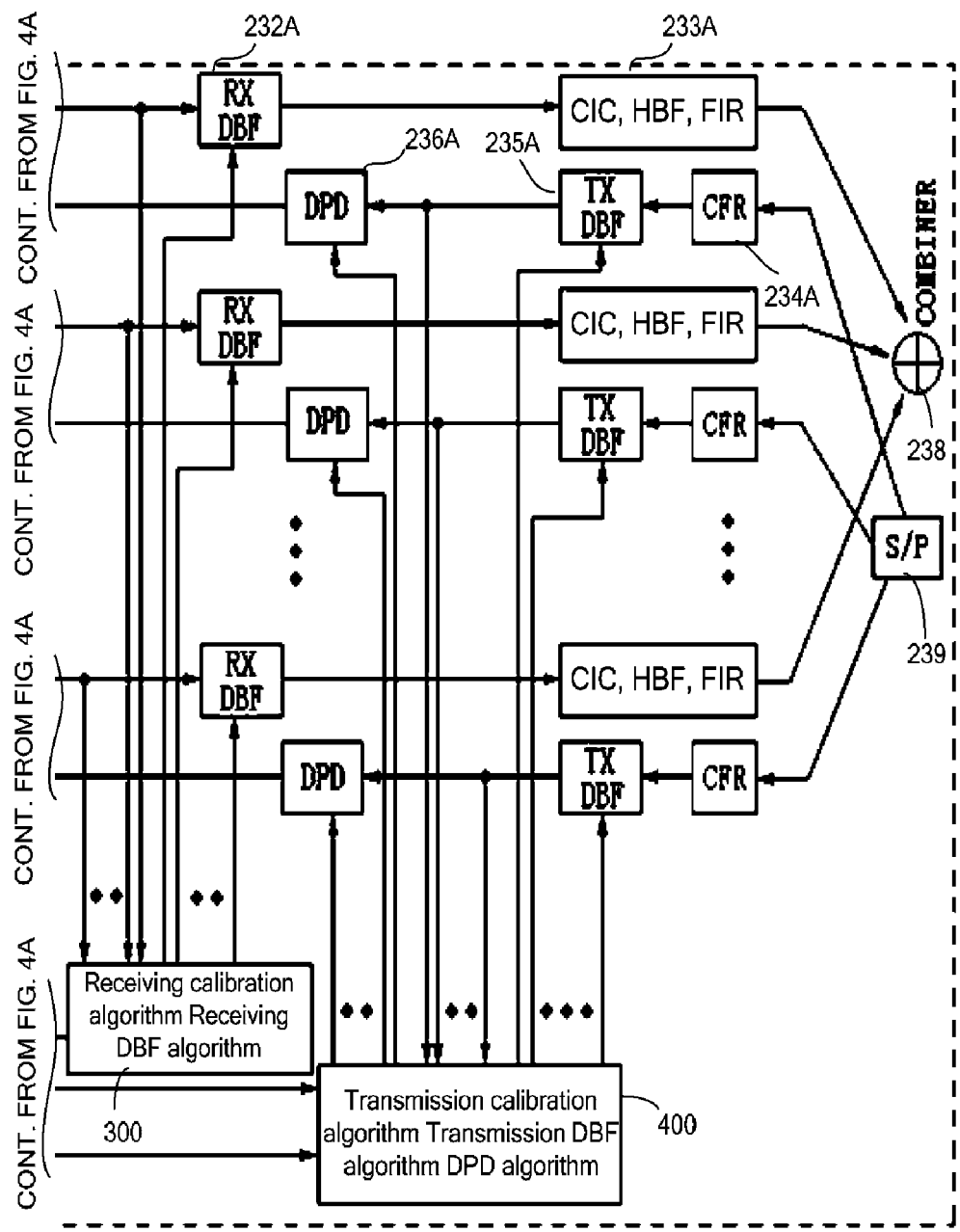

As shown in FIG. 3 and FIG. 4, the receiving calibration algorithm module 301A and the receiving DBF algorithm module 302 may be integrated into a module 300; the transmission calibration algorithm module 401 including a DPD algorithm module; and the transmission DBF algorithm module 405 may be integrated into a module 400.

The receiving amplitude and phase value may be the average value of the amplitudes and phase values of all the receiving channels; or the receiving calibration algorithm module 301A finds the minimum value or maximum value of the amplitudes and phases of all the receiving channels, and may use the minimum value or maximum value as the receiving amplitude and phase value; or the receiving calibration algorithm module 301A may use the amplitude and phase of any receiving channel as the receiving amplitude and phase value according to the amplitudes and phase of all the receiving channels.

Similarly, the transmission amplitude and phase value may be the average value of the amplitudes and phase values of all the transmission channels; or the transmission calibration algorithm module 401 finds the minimum value or maximum value of the amplitudes and phases of all the transmission channels according to the amplitudes and phase of all the receiving channels, and may use the minimum value or maximum value as the transmission amplitude and phase value; or the transmission calibration algorithm module 401 may use the amplitude and phase of any transmission channel as the transmission amplitude and phase value according to the amplitudes and phase of all the receiving channels.

The DBF receiving module 232A is connected to the filter processing module 233A and the ADC 231A respectively. The DBF transmitting module 235A is connected to the CFR 234A and the DPD 236A.

In this embodiment, the process of receiving and transmitting signals by the active antenna is as follows:

During signal reception, the antenna dipole 111 converts the electromagnetic wave signal received from the mobile station into an RF signal, and receives an IQ analog signal down-converted by the down-converter module 224A through the duplexer 221A and the LNA 222A; after the IQ analog signal is converted by the ADC 231A and undergoes the DBF by the DBF receiving module 232A, the IQ analog signal is processed by the filter processing modules 233A such as the CIC decimation filter, HBF, and FIR; the signal is combined by the combiner 238, and is then transmitted to the BBU.

During signal transmission, the signal sent from the BBU is converted by the S/P 239 into multiple transmission IQ digital signals; the signals enter each transmission channel; after undergoing the CFR by the CFR 234A, the signals undergo the DBF by the DBF transmitting module 235A; the signals undergo the DPD by the DPD 236A and conversion by the DAC 237A; the signals are then modulated by the up-converter module 225A into RF signals through up-conversion; after being amplified by the PA 223A, the RF signals reach the duplexer 221A, and are transmitted by the antenna dipole 111.

As shown in FIG. 3, the transceiving calibration unit 14 includes:

a receiving calibration channel 241, connected to the receiving calibration algorithm module 301A at one end through the DAC of the DPU and connected to a switch matrix 243 at the other end and adapted to modulate the IQ analog signal into a receiving calibration RF signal through up-conversion when the IQ digital signal generated by the receiving calibration algorithm module 301A is converted into an IQ analog signal;

a transmission calibration channel 242, connected to the transmission calibration algorithm module 401 at one end through the ADC of the DPU and connected to the switch matrix 243 at the other end and adapted to demodulate the RF signal of the transmission channel in the transceiver array into a transmission calibration IQ analog signal through down-conversion; and the switch matrix 243, connected to the transmission calibration channel 242 and the receiving calibration channel 241 at one end and coupled with the front ends of the receiving channel and transmission channel in the transceiver array through a coupler 402 and adapted to switch the receiving channel and transmission channel in the transceiver array on a time division basis so as to ensure that each receiving channel shares the receiving calibration channel and each transmission channel shares the transmission calibration channel.

The front ends of the receiving channel and transmission channel in the transceiver array may be located between the antenna dipole and the duplexer (that is, between the antenna dipole and the duplexer in the receiving channel or between the duplexer and the antenna dipole in the transmission channel).

The selection of the receiving channel and transmission channel by the switch matrix 243 may be controlled by a switch matrix control module 244. The switch matrix control module 244 may be integrated with the switch matrix 243 into a module or be located in the DPU 13.

As shown in FIG. 3 and FIG. 4, the switch matrix 234 may be replaced by the duplexer 261 and the combiner 262, which has advantage in that the switch matrix control module 244 is not required and that all the transceiver channels may be calibrated at the same time, thus shortening the calibration time.

When the receiving is calibrated, all the receiving channels are calibrated at the same time. The receiving calibration algorithm module 301A transmits a receiving calibration signal; the receiving calibration channel 241 up-converts the receiving calibration signal into an RF signal; the RF signal passes through the duplexer 261, combiner 262, and coupler 402 in the calibration channel, and is coupled into all the receiving channels; after the signal is converted into an IQ digital signal through down-conversion and ADC in all the receiving channels, the signal is input to the receiving calibration algorithm module 301A; the calibration signals in M receiving channels are demodulated.

The difference between the calibration signals of the M receiving channels and the original receiving calibration signals is obtained by comparing the calibration signals of the M receiving channels with the original receiving calibration signals, and a receiving amplitude and a phase value are obtained. The receiving calibration algorithm module 301A compares the receiving amplitude and phase with the amplitude and phase of each receiving channel, and obtains a receiving calibration factor of the amplitude and phase of each receiving channel.

When the transmission is calibrated, all the transmission channels are calibrated at the same time. The transmission calibration algorithm module 401 transmits M transmission calibration signals (with the only difference in the initial phase) to M transmission channels; the signals are modulated into RF signals in the transmission channel through up-conversion; the signals are coupled to the combiner 262 and duplexer 261 through the coupler 402 from the PA 223A; the signals are down-converted into IQ signals, and input to the transmission calibration algorithm module 401; the calibration signals of M transmission channels are demodulated.

The difference between the calibration signals of the M transmission channels and the original M transmission calibration signals is obtained by comparing the calibration signals of the M transmission channels with the original M transmission calibration signals, and a transmission amplitude and a phase value are obtained. The transmission calibration algorithm module 401 compares the transmission amplitude and phase value with the amplitude and phase of each transmission channel, and obtains a transmission calibration factor of the amplitude and phase of each transmission channel.

Figure 5:
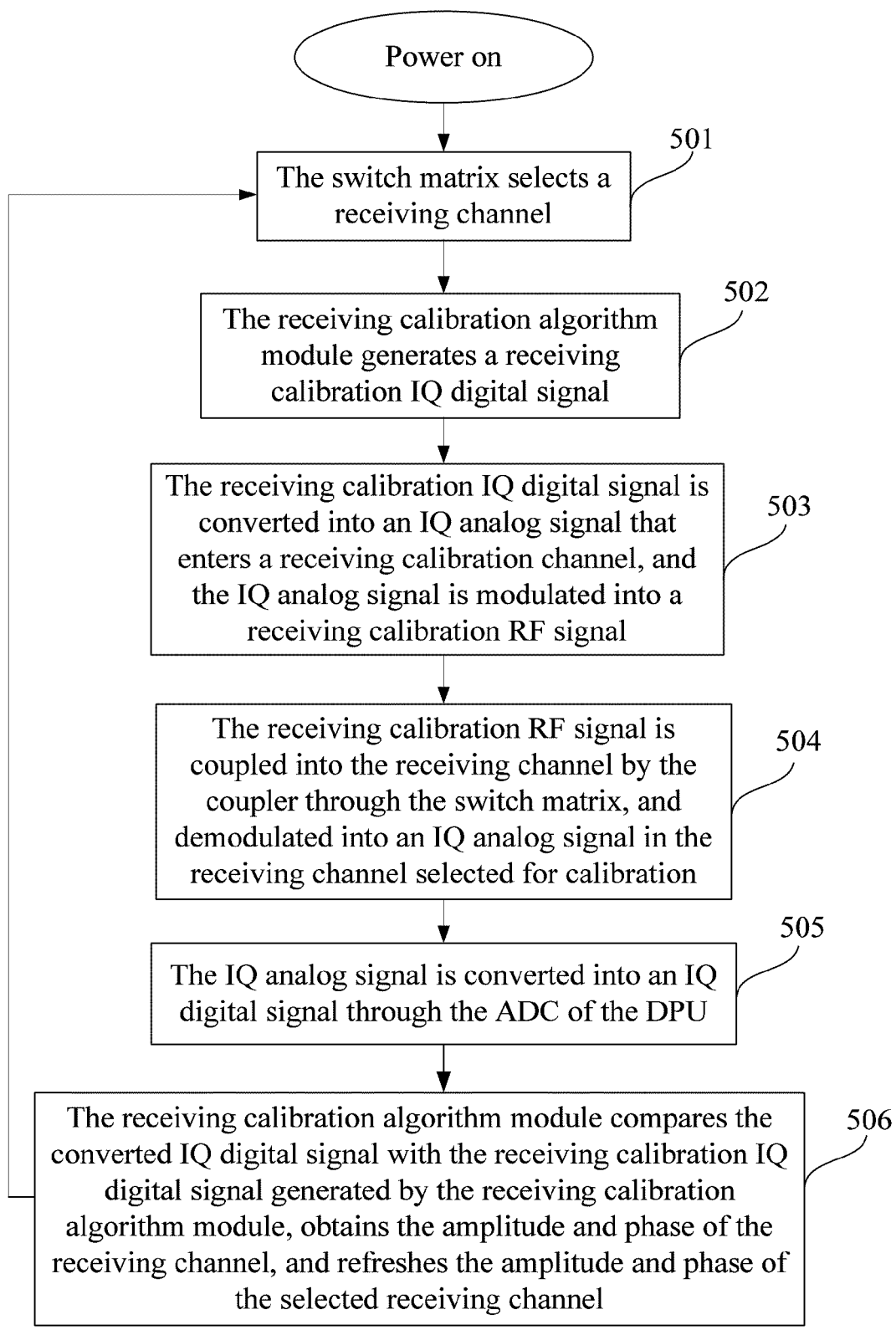
FIG. 5 shows a process of refreshing the amplitude and phase of a receiving channel according to an embodiment of the present invention.

FIG. 5 shows a process of refreshing the amplitude and phase of a receiving channel in an embodiment of the present invention. The process of refreshing the amplitude and phase of the receiving channel includes the following steps:

Step 501: The switch matrix selects a receiving channel.

Step 502: The receiving calibration algorithm module 301A generates a receiving calibration IQ digital signal.

Step 503: The receiving calibration IQ digital signal is converted into an IQ analog signal through the DAC, and the IQ analog signal enters a receiving calibration channel, and the IQ analog signal is modulated into a receiving calibration RF signal through up-conversion.

Step 504: The receiving calibration RF signal is coupled into the receiving channel by the coupler 402 through the switch matrix 243, and reverts to an IQ analog signal through down-conversion in the receiving channel selected for calibration.

Step 505: The IQ analog signal is converted into an IQ digital signal through the ADC of the DPU.

Step 506: The receiving calibration algorithm module 301A compares the IQ digital signal that has undergone ADC with the receiving calibration IQ digital signal generated by the receiving calibration algorithm module 301A, obtains the amplitude and phase of the receiving channel, and refreshes the amplitude and phase of the selected receiving channel.

The above process of refreshing the amplitude and phase of the receiving channel is repeated to refresh the amplitude and phase of a next receiving channel.

The step of reverting to an IQ analog signal through down-conversion in the receiving channel selected for calibration includes: the receiving down-converter module 224A in the transceiver reverts the receiving calibration RF signal to an IQ analog signal through down-conversion.

It should be noted that power-on needs to be performed before the process of refreshing the amplitude and phase of the receiving channel begins.

Further, the process of refreshing the amplitude and phase of the receiving channel further includes: refreshing the amplitudes and phases of all the receiving channels. The receiving calibration algorithm module 301A obtains a receiving amplitude and a phase value according to the amplitudes and phases of all the receiving channels; the receiving calibration algorithm module 301A compares the receiving amplitude and phase value with the amplitude and phase of each receiving channel, and obtains a receiving calibration factor of the amplitude and phase of each receiving channel; the receiving DBF algorithm module 302 configures the receiving calibration factor on the DBF receiving module in each receiving channel.

The receiving amplitude and phase value may be the average value of the amplitudes and phase values of all the receiving channels; or the receiving calibration algorithm module 301A finds the minimum value or maximum value of the amplitudes and phases of all the receiving channels according to the amplitudes and phases of all the receiving channels, and the minimum value or maximum value may be used as the receiving amplitude and phase value; or the receiving calibration algorithm module 301A may use the amplitude and phase of any receiving channel as the receiving amplitude and phase value according to the amplitudes and phases of all the receiving channels.

For example, the DPU 13 sends a digital signal A1 (the A1 may be a special signal, such as a single sine signal, a pseudo-random signal, and a pseudo-noise signal); after the A1 is DAC converted by the DPU 13, the signal is modulated through up-conversion into an RF signal in the receiving calibration channel 241; the RF signal passes through the switch matrix 243, and is coupled into a receiving channel in the transceiver array between the antenna dipole and the duplexer; the coupled signal passes through the duplexer, the LNA, and the receiving down-converter module; the coupled signal undergoes the ADC processing, and a digital signal A2 is obtained; after the A1 and A2 are compared, the amplitude and phase of the receiving channel are obtained. Because the coupling point is located before the duplexer, the impacts of the duplexer on the amplitude and phase of the receiving signal are also considered.

Figure 6:
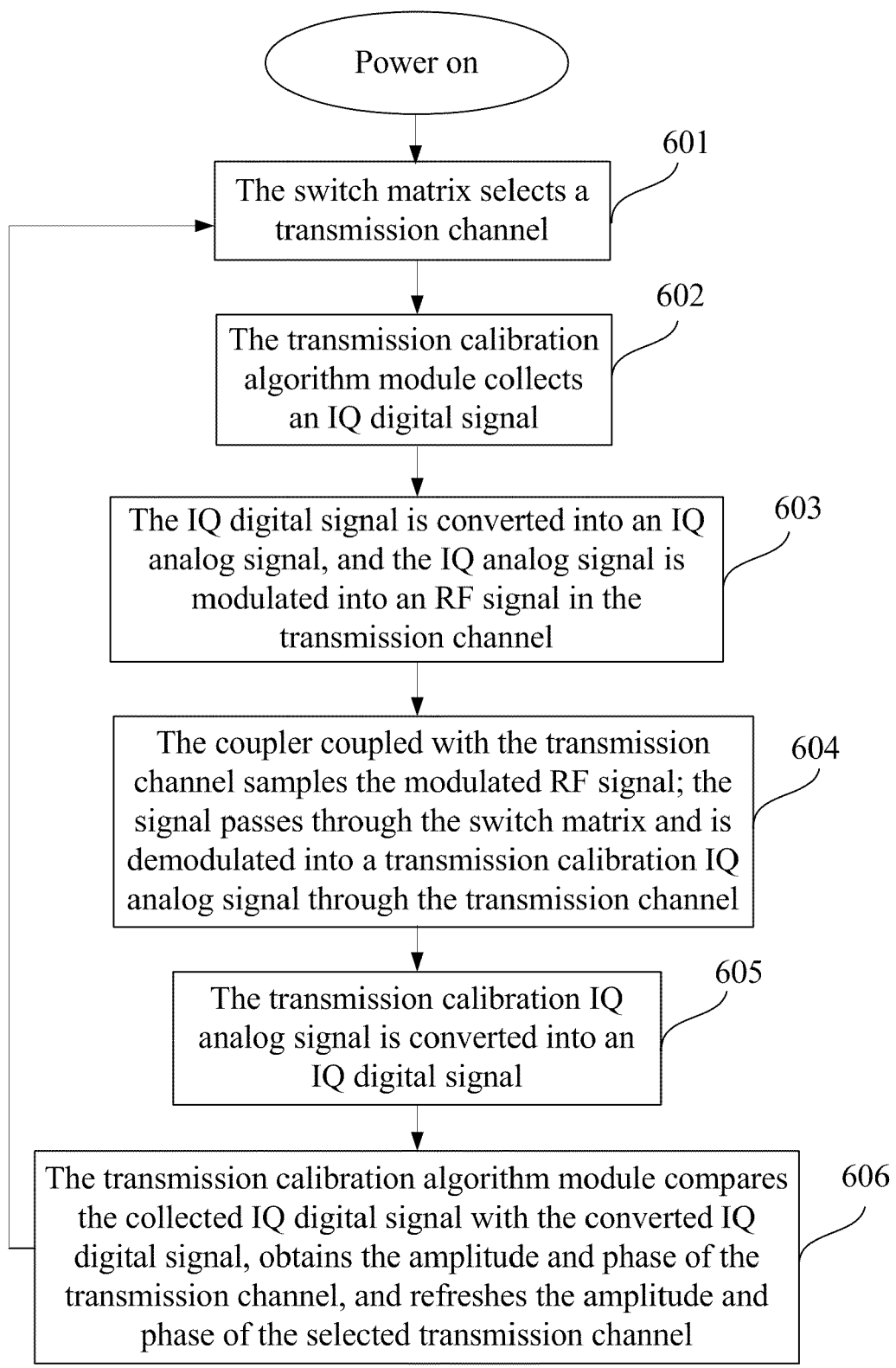
FIG. 6 shows a process of refreshing the amplitude and phase of a transmission channel according to an embodiment of the present invention.

FIG. 6 shows a process of refreshing the amplitude and phase of a transmission channel in an embodiment of the present invention. The process of refreshing the amplitude and phase of the transmission channel includes the following steps:

Step 601: The switch matrix selects a transmission channel.

Step 602: The transmission calibration algorithm module collects an IQ digital signal.

Step 603: The IQ digital signal is converted into an IQ analog signal through ADC, and the IQ analog signal is modulated into an RF signal in the transmission channel through up-conversion.

Step 604: The coupler 402 coupled with the transmission channel samples the up-converted RF signal. The signal passes through the switch matrix and is demodulated through down-conversion into a transmission calibration IQ analog signal through the transmission calibration channel.

Step 605: The transmission calibration IQ analog signal is converted into an IQ digital signal through the ADC.

Step 606: The transmission calibration algorithm module 401 compares the collected IQ digital signal with the IQ digital signal that is converted through the ADC, obtains the amplitude and phase of the transmission channel, and refreshes the amplitude and phase of the selected transmission channel.

The switch matrix selects a next transmission channel and step 602 is repeated to start a new process of refreshing the amplitude and phase of the transmission channel.

It should be noted that power-on needs to be performed before the process of refreshing the amplitude and phase of the transmission channel begins.

For example, the signal sent from the BBU is converted into an X1 signal through serial-parallel conversion; after the X1 signal undergoes the DAC by the DPU, the X1 signal is modulated into an RF signal by the transmission up-converter module; the RF signal passes through the PA and the duplexer, and after being sampled by the coupler, enters the transmission calibration channel from the switch matrix; the RF signal is reverted to an IQ analog signal through down-conversion in the transmission calibration channel; the IQ analog signal enters the DPU; after the IQ analog signal undergoes the ADC, a digital signal Y1 is obtained; the X1 and Y1 are compared, and the amplitude and phase of the transmission channel are obtained. Because the coupling point is located after the duplexer, the impacts of the duplexer on the amplitude and phase of the transmission signal are also considered.

The process of refreshing the amplitude and phase of the transmission channel further includes: when refreshing the amplitudes and phases of all the transmission channels, the transmission calibration algorithm module 401 obtains a transmission amplitude and a phase value according to the amplitudes and phases of all the transmission channels, compares the transmission amplitude and phase value with the amplitude and phase of each transmission channel, and obtains a transmission calibration factor of the amplitude and phase of each transmission channel. The transmission DBF algorithm module 405 configures the transmission calibration factor on the DBF transmitting module of each transmission channel.

The transmission amplitude and phase value may be the average value of the amplitudes and phase values of all the transmission channels; or the transmission calibration algorithm module 401 finds the minimum value or maximum value of the amplitudes and phases of all the transmission channels according to the amplitudes and phases of all the transmission channels, and may use the minimum value or maximum value as the transmission amplitude and phase value; or the transmission calibration algorithm module 401 may use the amplitude and phase of any transmission channel as the transmission amplitude and phase value according to the amplitudes and phases of all the transmission channels.

Thus, coupling the transmission signal to the transmission calibration channel at the front end (between the antenna dipole and the duplexer) or coupling the receiving calibration RF signal to the receiving channel may avoid the inconsistency in terms of amplitude and phase introduced by the duplexer, and enable the receiving calibration and transmission calibration to share the same coupling channel, thus simplifying the circuit design and reducing the area of the PCB.

The switch matrix 243 may be used to perform switching for the following reasons: Firstly, because there are multiple transceivers, if the receiving channel and transmission channel are configured with a receiving calibration channel and a transmission calibration channel, the circuit structure may be complex. Secondly, if the calibration channel is not shared, the receiving calibration algorithm module 301A only knows the total amplitude and total phase of the loop formed by the receiving calibration channel and the receiving channel, and cannot know respective amplitudes and phases of the receiving calibration channel and the receiving channel. Similarly, the transmission calibration algorithm module 405 only knows the total amplitude and total phase of the loop formed by the transmission calibration channel and the transmission channel and cannot know respective amplitudes and phases of the transmission calibration channel and the transmission channel. Thus, the calibration cannot be performed accurately. Thirdly, although the amplitude and phase characteristics of the active circuit always change, the rate of variation with the time is small. Thus, the variation rate may be tracked correctly by a transceiver calibration channel according to the time division multiplexing method.

To ensure that the amplitudes and phases of the RF signals received by each receiving channel in the transceiver array have the same reference, each receiving channel in the transceiver array shares a same receiving local oscillation signal. To ensure that the amplitudes and phases of the RF signals transmitted by each transmission channel in the transceiver array have the same reference, each transmission channel in the transceiver array shares a same transmission local oscillation signal. These operations may be implemented by sharing a voltage control oscillator (VCO).

Figure 7:
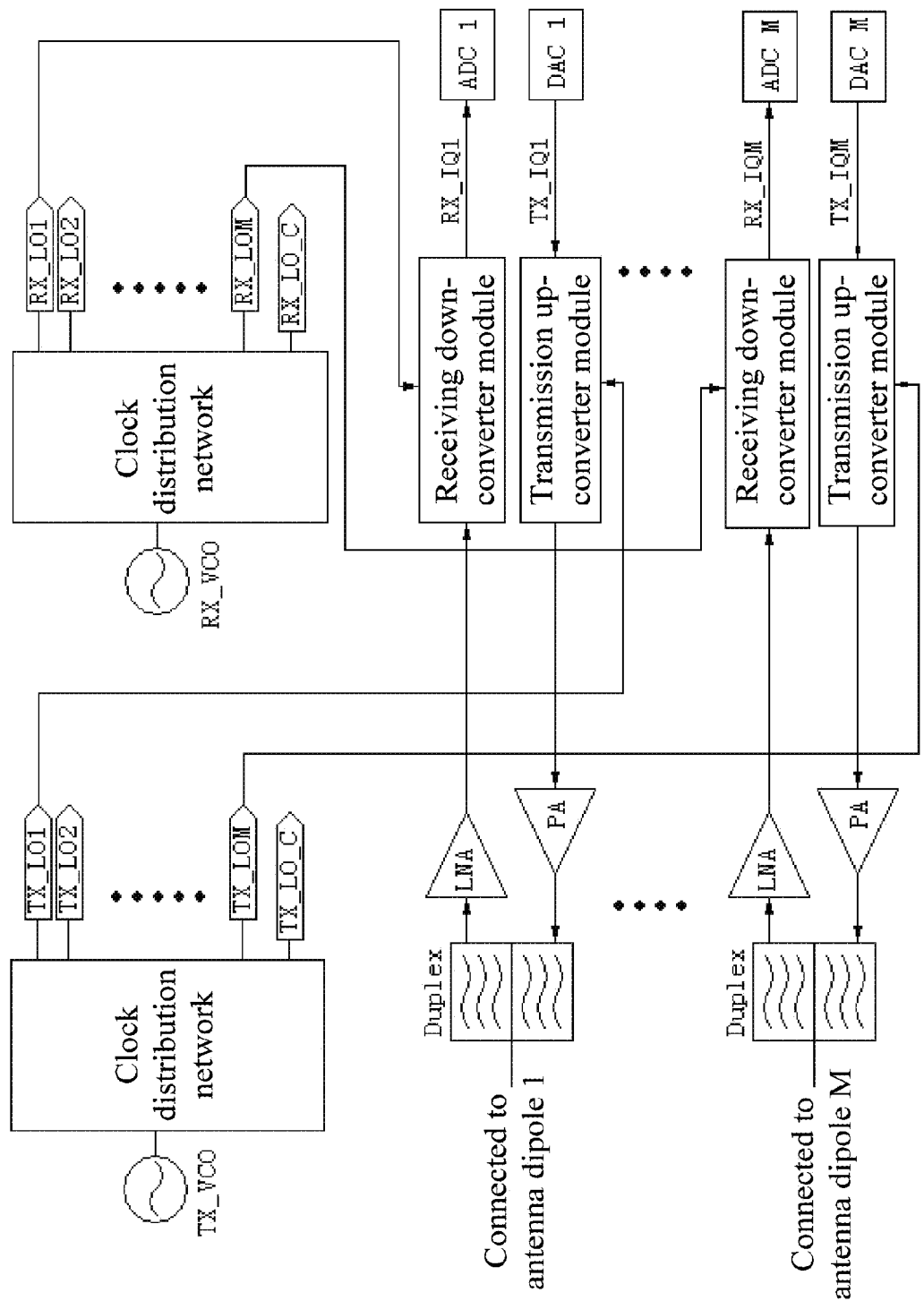
FIG. 7 illustrates the sharing of a local oscillation signal by each transmission channel and each receiving channel in a transceiver array according to an embodiment of the present invention.

FIG. 7 illustrates the sharing of a local oscillation signal by each transmission channel and each receiving channel in the transceiver array. The output signal of the transmission channel VCO (TX_VCO) is split into TX_LO1, TX_LO2, . . . , TX_LOM, and TX_LO_C signals by a clock driving distribution network. These signals are in parallel, where TX_LO1, TX_LO2, . . . , TX_LOM are connected to M transmission up-converter circuits respectively and used as local oscillation signals of the transmission channel; and TX_LO_C is connected to the transmission calibration channel and used as a local oscillation signal. The output signal of the receiving channel VCO (RX_VCO) is split into RX_LO1, RX_LO2, . . . , RX_LOM, and RX_LO_C signals by the clock driving distribution network. These signals are also in parallel, where RX_LO1, RX_LO2, . . . , RX_LOM are connected to M receiving down-converter circuits respectively and used as local oscillation signals of the receiving channel, and RX_LO_C is connected to the receiving calibration channel and used as the local oscillation signal of the receiving calibration channel.

The DPD module in each transmission channel of the DPU 13 is adapted to linearize the PA of each transmission channel in the transceiver array. An independent DPD feedback channel (see FIG. 4) may be used, or the transmission calibration channel may be used as a DPD feedback channel (see FIG. 3).

The DPD algorithm process is similar to the process of refreshing the amplitude and phase of the transmission channel except for the following differences: The comparison result of the amplitude and phase reflects the non-linear characteristics of the transmission channel; the IQ digital signal is calibrated according to the non-linear characteristics to linearize the transmission channel. Thus, the DPD feedback channel may also use all the hardware circuits of the transmission calibration channel. However, it is necessary to add a DPD algorithm and a DPD module in the DPU 13, which is not further described.

If the DPD feedback channel and the transmission calibration channel are shared, the number of couplers may be reduced by half. The DPD feedback channel and the transmission calibration channel may not be shared. As shown in FIG. 4, the DPD switch control module 251 controls the DPD channel switch matrix 253 to select a transmission channel; the DPD feedback channel 252 is coupled with the output end of the PA in each transmission channel in the transceiver array, and is adapted to switch the transmission channel on a time division basis to enable each transmission channel to share the DPD feedback channel.

Because DPD is used to improve the non-linearity of large signals (for example, signals whose power is greater than 2W) of the PA, DPD is not required in the receiving channel.

In this embodiment, on the active antenna, during signal reception, the DPU performs DBF on the IQ digital signal according to the transceiving calibration unit; during signal transmission, the DPU performs DBF on the IQ digital signal converted through serial-parallel conversion according to the transceiving calibration unit. In this way, the amplitudes and phases for transmitting and receiving the RF signal are adjusted. Thereby, the complex structure and uncertainty of the phase shifter network can be avoided.

Further, due to the diversity of components in the transceiver array 12, a same signal is input to two transceivers at the same time. The two signals obtained may vary in the amplitude and phase characteristics. The additional transceiver calibration unit may work with the DBF algorithm modules 235A and 232A to perform the DBF. To process a receiving IQ analog signal, the DPU 13 needs to pre-calibrate the converted receiving IQ digital signal by using DAC231A, so that the combiner 238 accumulates the receiving IQ digital signal according to a related algorithm. To process a transmission IQ analog signal, the DPU 13 pre-calibrates the transmission IQ digital signal by using the DBF algorithm module 235A, so as to adjust the amplitude and phase of the transmission RF signal and obtain a correct transmission pattern and receiving pattern.

Embodiment 2

In this embodiment, the DBF processing modules (including the DBF receiving module and the DBF transmitting module) in the DPU 13 are mode-based or carrier-based, and may process multi-mode and multi-carrier transceiver IQ analog signals.

Figure 8:
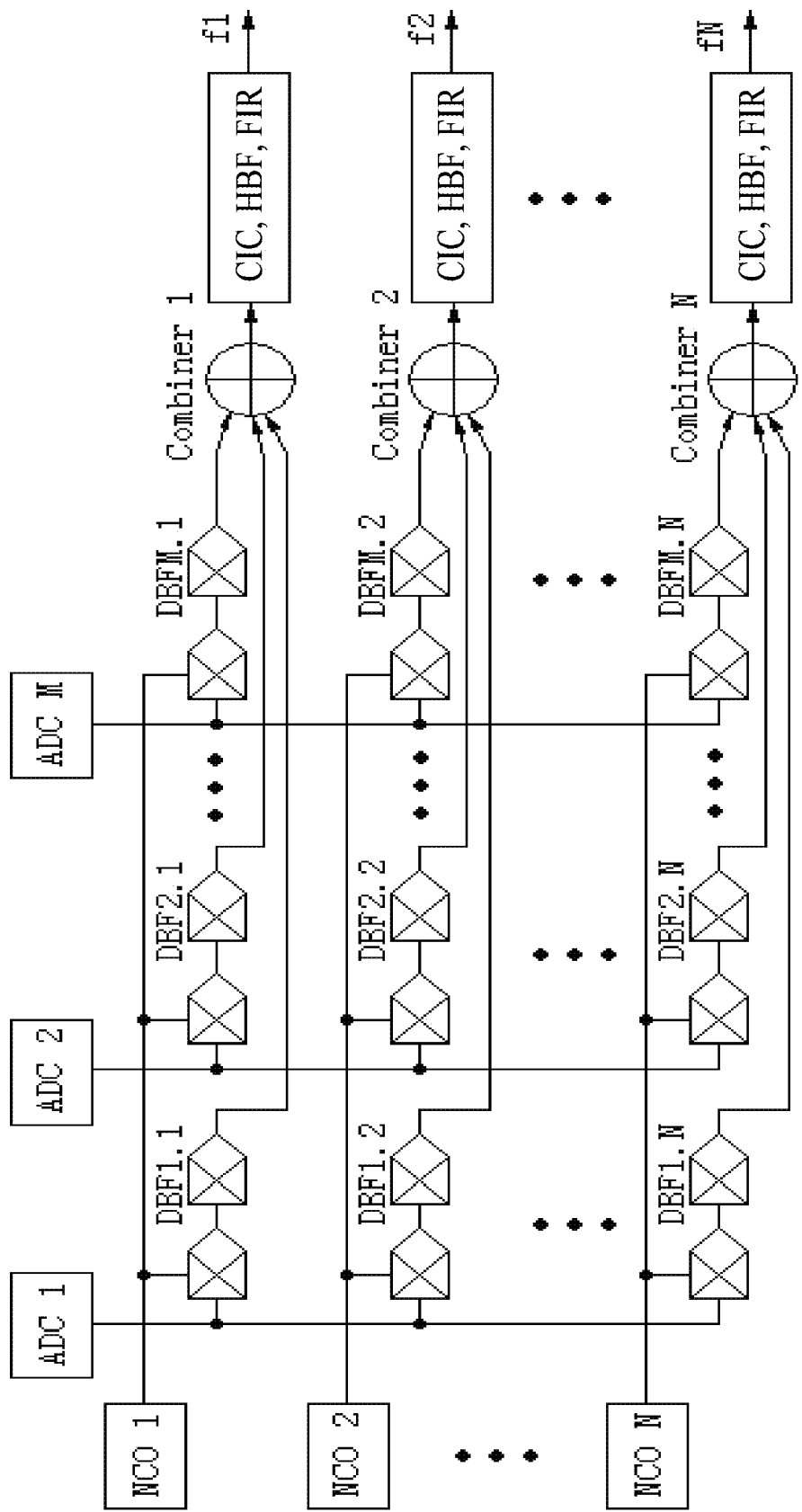
FIG. 8 is a schematic diagram illustrating a mode-based or carrier-based receiving DBF processing module according to an embodiment of the present invention.

FIG. 8 is a schematic diagram illustrating a mode-based or carrier-based receiving DBF processing module in an embodiment of the present invention.

The IQ analog signals of each receiving channel (supposing M receiving channels in total) are converted into M IQ digital signals through the ADC; each of the IQ digital signals in the M receiving channels is multiplied (digital down conversion) by the signals output by the mode-based or carrier-based numerical control oscillators NCO1, NCO2, . . . , NCON, and split into N single-mode receiving signals or N single-carrier receiving signals.

The first single-mode receiving signal or the first single-carrier receiving signal in the M receiving channels undergoes the DBF by the DBF1.1, DBF2.1, . . . , DBFM.1 respectively; after the signal is combined by the combiner (combiner 1 in FIG. 8) and processed by the CIC, the HBF, and the FIR, a first signal f1 (shown in FIG. 8) is obtained.

Similarly, the second single-mode receiving signal or the second single-carrier receiving signal is processed by the DBF1.2, DBF2.2, . . . , DBFM.2 respectively; after the signal is combined by the combiner 2 (shown in FIG. 8) and processed by the CIC, the HBF, and the FIR, a second signal f2 (shown in FIG. 8) is obtained.

Similarly, the $N^{th}$ single-mode receiving signal or multiple single-carrier receiving signals are processed by the DBF1.N, DBF2.N, . . . , DBFM.N respectively; after the signal is combined by the combiner N (shown in FIG. 8) and processed by the CIC, the HBF, and the FIR, an $N^{th}$ signal fN (shown in FIG. 8) is obtained.

The combiner 238 combines signals f1, f2, . . . , fN into a signal, and outputs the signal to the BBU.

Signals f1, f2, . . . , fN may be a single-carrier or single-mode IQ digital signal.

Figure 9:
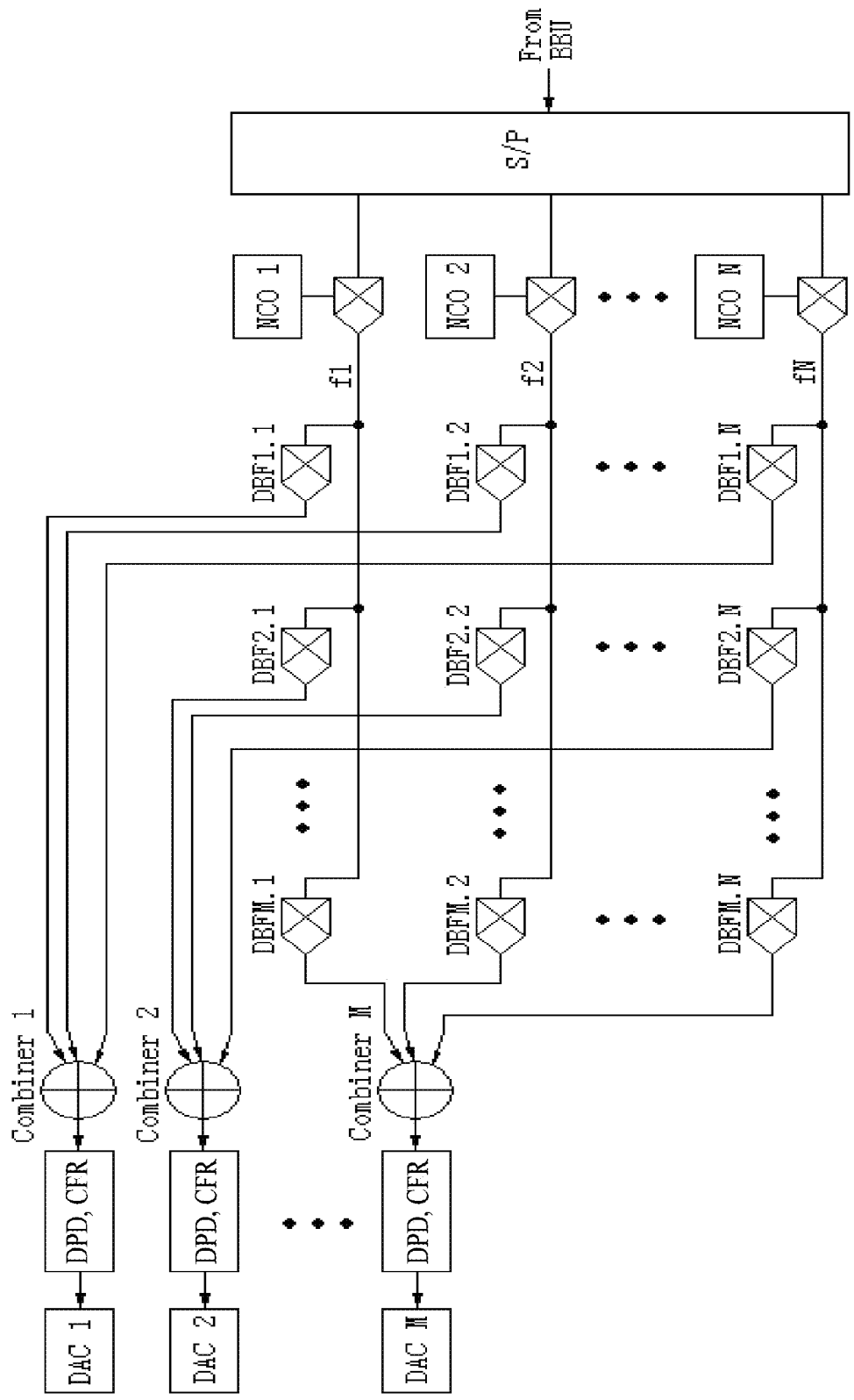
FIG. 9 is a schematic diagram illustrating a mode-based or carrier-based transmission DBF processing module according to an embodiment of the present invention.

FIG. 9 is a schematic diagram illustrating a mode-based or carrier-based transmission DBF processing module in an embodiment of the present invention.

The signal sent from the BBU is converted into N IQ digital signals (corresponding to N NCOs) by the S/P 239; each of the N IQ digital signals is multiplied (digital down conversion) by the signals output by mode-based or carrier-based numerical control oscillators NCO1, NCO2, . . . , NCON, and N single-mode transmission signals or N single-carrier transmission signals (f1, f2, . . . , fN shown in FIG. 9) are obtained; after N single-mode transmission signals or N single-carrier transmission signals (f1, f2, . . . , fN shown in FIG. 8) are processed by the DBF1.1, DBF1.2, . . . , DBF1.N respectively, the signals are combined according to a predetermined algorithm, and a mode-based or carrier-based mixture transmission signal (that is, the first signal combined by the combiner 1 in FIG. 9) is obtained.

Similarly, after N single-mode transmission signals or N single-carrier transmission signals (f1, f2, f3, . . . , fN) are processed by the DBF2.1, BF2.2, . . . , DBF2.N respectively, the signals are combined according to a predetermined algorithm, and a second mode-based or carrier-based mixture transmission signal (that is, the second signal combined by the combiner 2) is obtained.

Similarly, after N single-mode transmission signals or N single-carrier transmission signals (f1, f2, f3, . . . , fN) are processed by the DBFM.1, DBFM.2, . . . , DBFM.N respectively, the signals are combined according to a predetermined algorithm, and an $M^{th}$ mode-based or carrier-based mixture transmission signal (that is, the $M^{th}$ signal combined by the combiner M) is obtained.

Thus, N single-mode transmission signals or N single-carrier transmission signals (f1, f2, f3, . . . , fN) are combined into M transmission signals. Then, each of M transmission signals undergoes the CFR and DPD respectively, and is converted into an IQ analog signal through the DAC. Finally, the IQ analog signals are output to each transmission channel of the transceiver.

Multi-mode and multi-carrier receiving signals and transmission signals may be processed according to the foregoing mode-based or carrier-based DBF algorithm. In this embodiment, the active antenna or the base station may obtain different mode-based or carrier-based radiation patterns.

Embodiment 3

Figure 10:
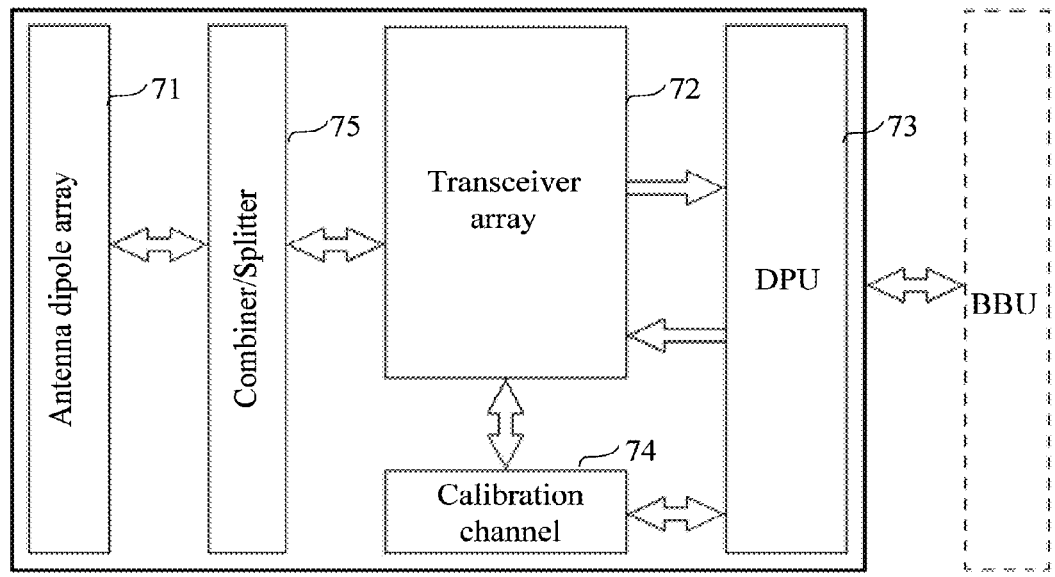
FIG. 10 shows a structure of an active antenna or a base station with a combiner/splitter according to an embodiment of the present invention.

On the basis of the active antenna or the base station provided in the first embodiment and/or the second embodiment, a simple power combiner/splitter network may be added. FIG. 10 shows a structure of an active antenna or a base station in an embodiment of the present invention.

The difference between the third embodiment and the first embodiment is as follows: A power combiner/splitter network 75 is added between the antenna dipole array 71 and the transceiver array 72; during signal reception, the power combiner/splitter network 75 may combine weak signals received by multiple antenna dipoles into a signal, and transmit the signal to the transceivers in the transceiver array 72; during signal transmission, the RF signals of the transceivers in the transceiver array are transmitted to multiple antenna dipoles through the power combiner/splitter network.

In this embodiment, the power combiner/splitter network may be formed by the Wilkinson power combiner/splitter network. Thus, the cable or the printed circuit board (PCB) connection features simplicity and low loss.

By using the active antenna provided in the third embodiment, each transceiver is connected to more than one antenna dipole (two or three antenna dipoles or any combination thereof are preferred). In this way, the quantity of transceivers is greatly reduced.

Embodiment 4

Figure 11:
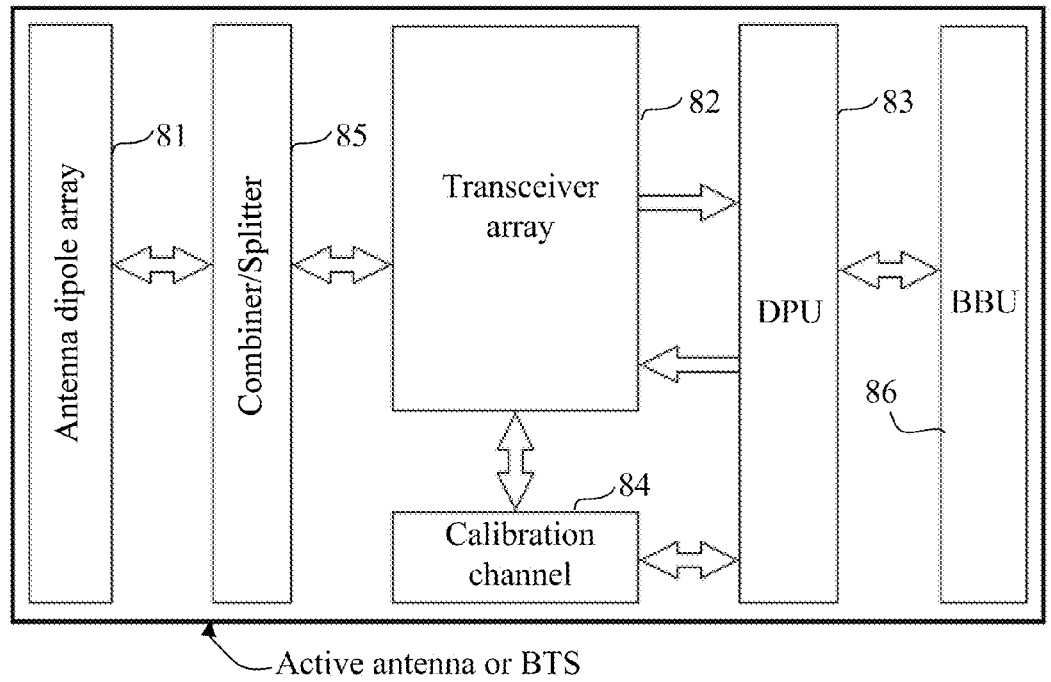
FIG. 11 shows a structure of a BBU integrated inside the active antenna or base station according to an embodiment of the present invention.

On the basis of the foregoing embodiments, the BBU may also be integrated in the active antenna or the base station, as shown in FIG. 11.

Compared with the foregoing embodiments, the fourth embodiment provides a simpler installation solution.

Figure 12:
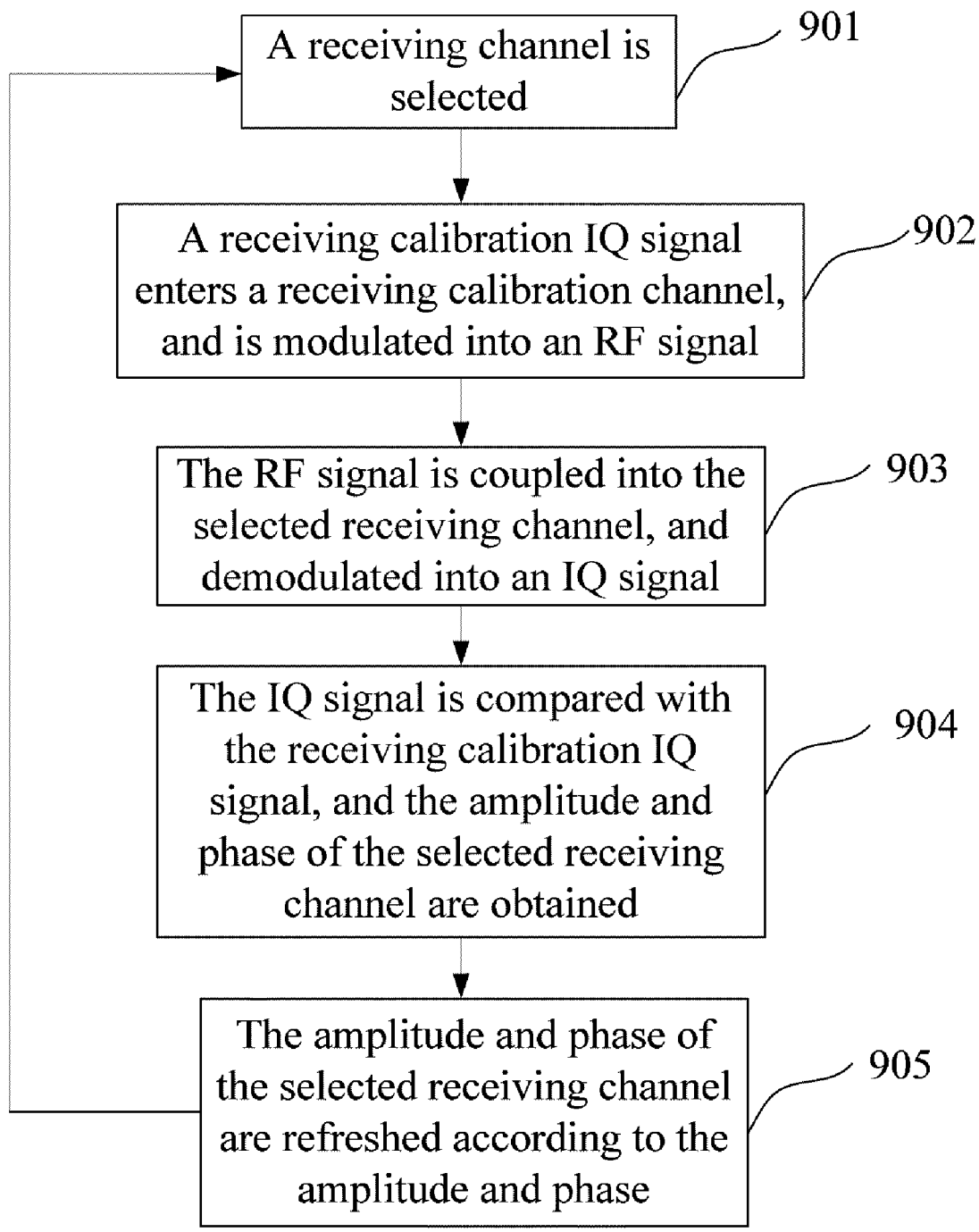
FIG. 12 is a flowchart of a method for refreshing a receiving channel according to an embodiment of the present invention.

On the basis of the foregoing embodiments, the fourth embodiment provides a method for refreshing a receiving channel. As shown in FIG. 12, the method includes the following steps:

Step 901: A receiving channel is selected.

Step 902: A receiving calibration IQ analog signal enters a receiving calibration channel, and is modulated into an RF signal through up-conversion.

Step 903: The RF signal is coupled into the selected receiving channel, and demodulated into an IQ analog signal through down-conversion.

Step 904: The IQ analog signal is compared with the receiving calibration IQ analog signal, and the amplitude and phase of the selected receiving channel are obtained.

Step 905: The amplitude and phase of the selected receiving channel are refreshed according to the amplitude and phase.

Figure 13:
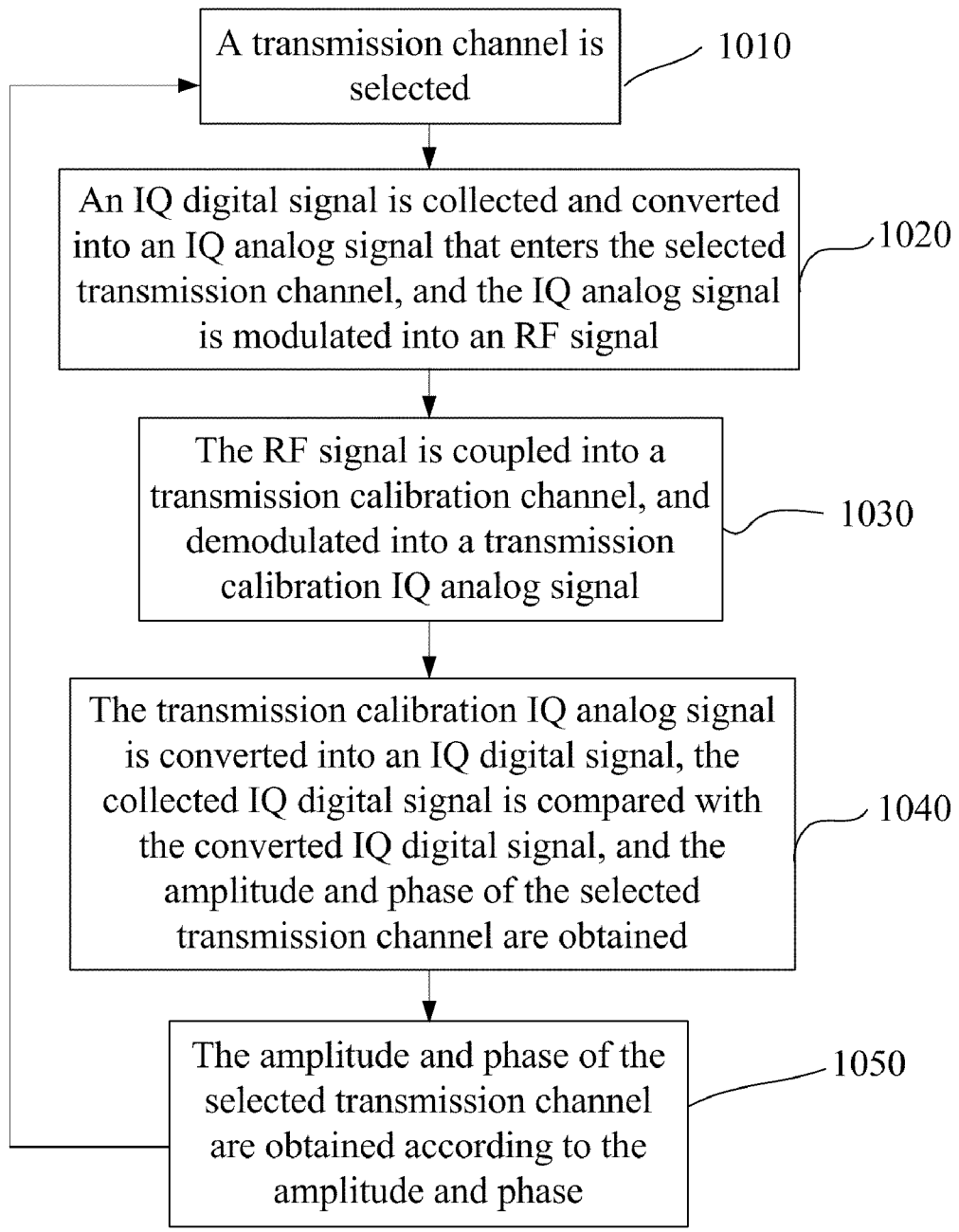
FIG. 13 is a flowchart of a method for refreshing a transmission channel according to an embodiment of the present invention.

On the basis of the foregoing embodiments, an embodiment of a method for refreshing a transmission channel is provided. As shown in FIG. 13, the method includes the following steps:

Step 1010: A transmission channel is selected.

Step 1020: An IQ digital signal is collected and converted into an IQ analog signal that enters the selected transmission channel, and the IQ analog signal is modulated into an RF signal through up-conversion.

Step 1030: The RF signal is coupled into a transmission calibration channel, and demodulated into a transmission calibration IQ analog signal through down-conversion.

Step 1040: The transmission calibration IQ analog signal is converted into an IQ digital signal, the collected IQ digital signal is compared with the converted IQ digital signal, and the amplitude and phase of the selected transmission channel are obtained.

Step 1050: The amplitude and phase of the selected transmission channel are refreshed according to the amplitude and phase.

By using the methods for refreshing the receiving channel and transmission channel in this embodiment, the IQ digital signal may be pre-calibrated to eliminate the inconsistency between all the receiving channels or between all the transmission channels in terms of amplitude and phase. In this way, all the receiving IQ digital signals may be accumulated according to a related algorithm in the DPU so as to obtain a correct receiving pattern, or the amplitudes and phases of the RF signals reaching the antenna dipole array are distributed regularly, and a correct transmission pattern is obtained.

Figure 14:
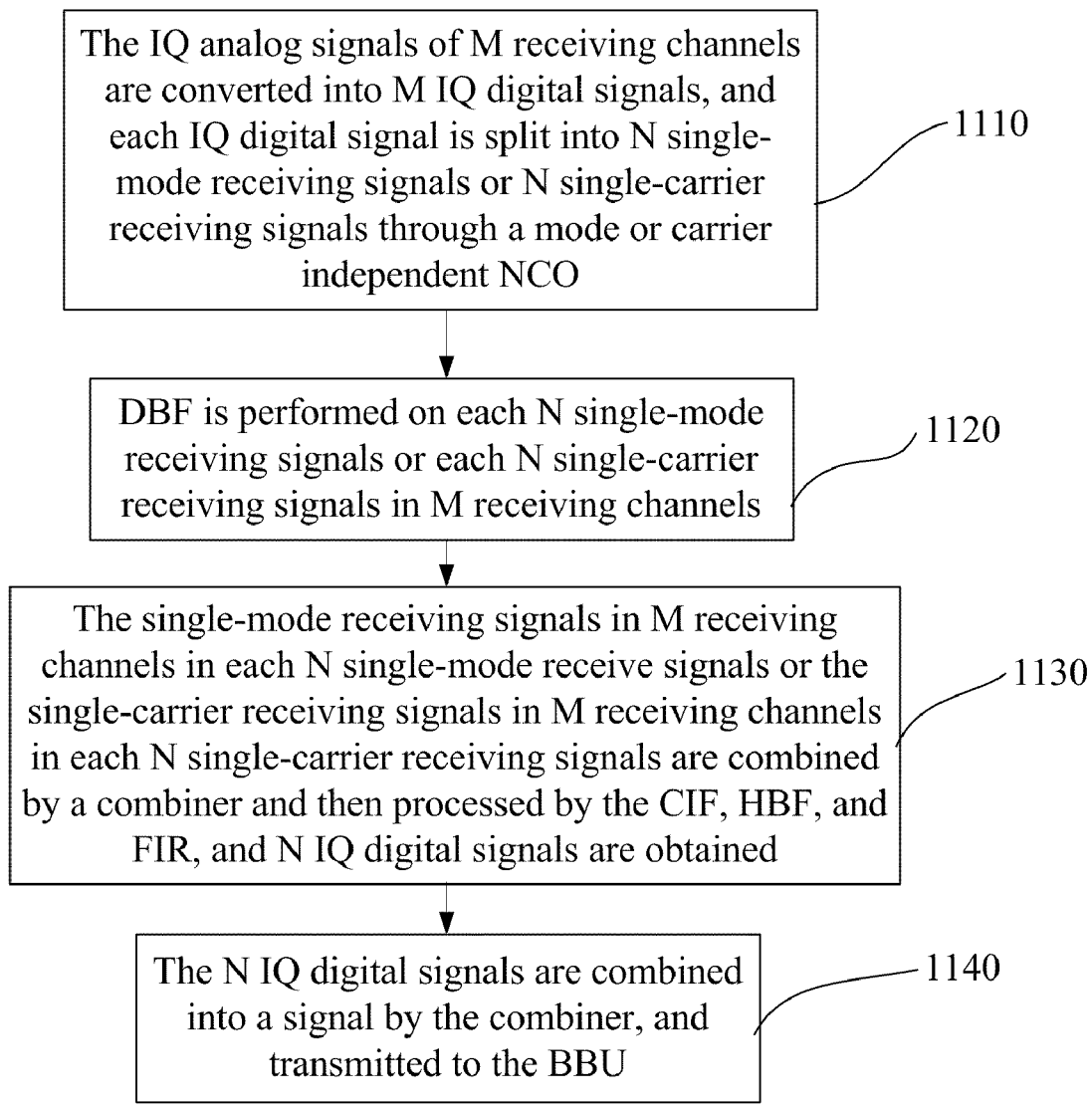
FIG. 14 is a flowchart of a mode-based or carrier-based DBF processing method for received signals according to an embodiment of the present invention.

An embodiment of a mode-based or carrier-based processing method for receiving signals is also provided. As shown in FIG. 14, the method includes the following steps:

Step 1110: The IQ analog signals of M receiving channels are converted into M IQ digital signals, and each IQ digital signal is split into N single-mode receiving signals or N single-carrier receiving signals through a mode-based or carrier-based NCO.

Step 1120: DBF is performed on each N single-mode receiving signals or each N single-carrier receiving signals in M receiving channels.

Step 1130: The single-mode received signals in M receiving channels in each N single-mode received signals or the single-carrier received signals in M receiving channels in each N single-carrier received signals are combined by a combiner and then processed by the CIC, HBF, and FIR, and N IQ digital signals are obtained.

Step 1140: The N IQ digital signals are combined into a signal by the combiner, and transmitted to the BBU.

The M receiving channels may be 3 to 20 receiving channels. Preferably, M may be 4 to 12, and N may be 1 to 8. Preferably, N may be 1 to 4.

Figure 15:
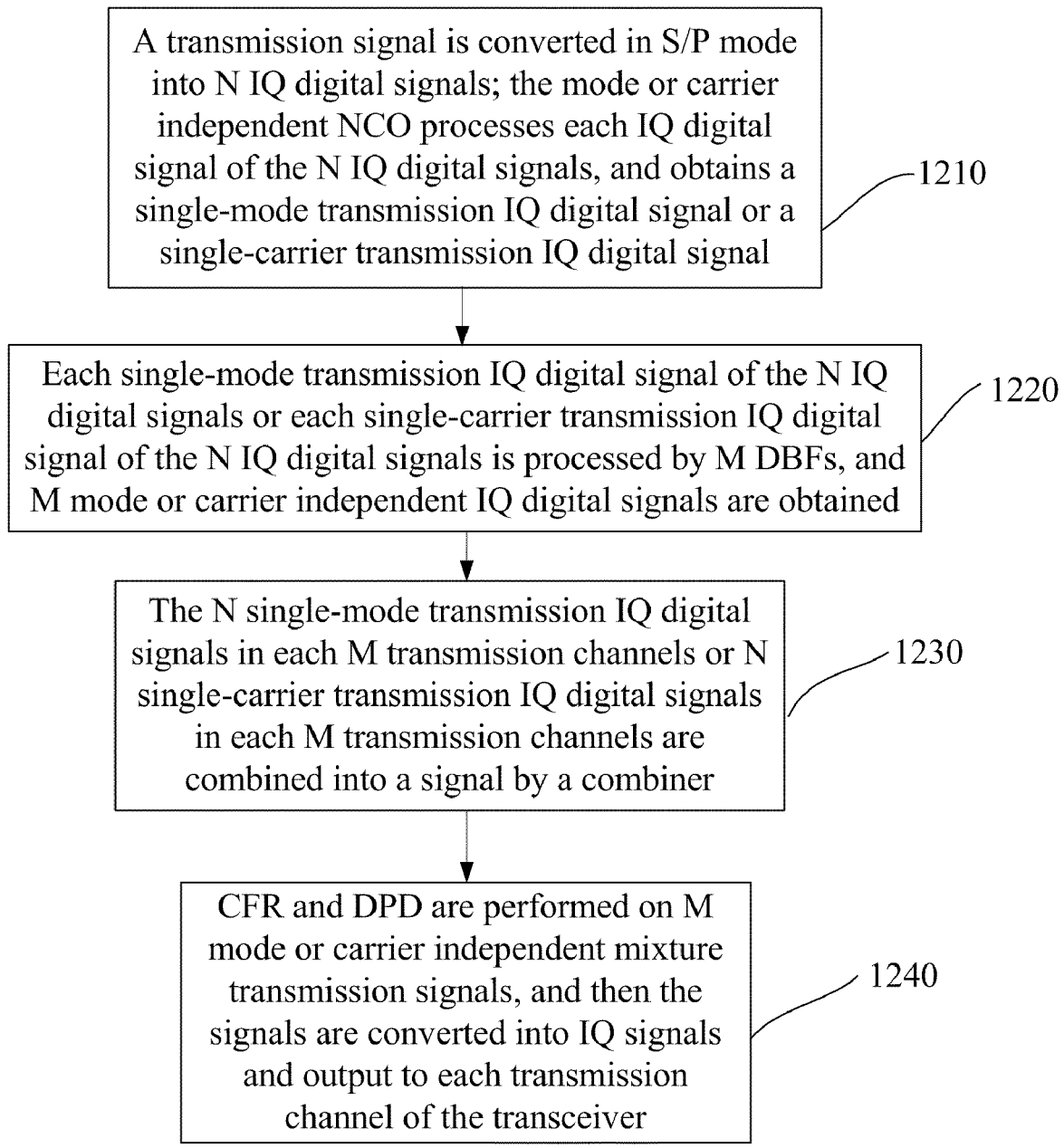
FIG. 15 is a flowchart of a mode-based or carrier-based DBF processing method for transmitting signals according to an embodiment of the present invention.

An embodiment of a mode-based or carrier-based processing method for transmitting signals also is provided. As shown in FIG. 15, the method includes the following steps:

Step 1210: A transmission signal is converted into N IQ digital signals through serial-parallel conversion. The mode-based or carrier-based NCO processes each IQ digital signal of the N IQ digital signals, and obtains a single-mode transmission IQ digital signal or a single-carrier transmission IQ digital signal.

Step 1220: Each single-mode transmission IQ digital signal of the N IQ digital signals or each single-carrier transmission IQ digital signal of the N IQ digital signals is processed by M DBFs, and M mode-based or carrier-based IQ digital signals are obtained.

Step 1230: The N single-mode transmission IQ digital signals in each M transmission channels or N single-carrier transmission IQ digital signals in each M transmission channels are combined into a signal by a combiner.

Step 1240: CFR and DPD are performed on M mode-based or carrier-based mixture transmission signals, and the M mode-based or carrier-based mixture transmission signals are converted into IQ analog signals and output to each transmission channel of the transceiver.

The M receiving channels may be 3 to 20 receiving channels. Preferably, M may be 4 to 12, and N may be 1 to 8. Preferably, N may be 1 to 4.

The mode-based or carrier-based signal processing method provided in this embodiment may be applied in the DPU on the active antenna or the base station provided in embodiments of the present invention. In this way, multi-mode and multi-carrier receiving signals and transmission signals may be processed, and different mode-based or carrier-based antenna patterns may be obtained.

It is understandable to those skilled in the art that all or part of the steps in the foregoing embodiments may be implemented by related hardware instructed by a program. The program may be stored in a computer readable storage medium. When the program is executed, the processes of the preceding methods are executed. The storage medium may be a magnetic disk, a compact disk-read only memory (CD-ROM), a read only memory (ROM) or a random access memory (RAM).

Detailed above are the active antenna or the base station, method for calibrating signals in the receiving and transmission channels, and mode-based or carrier-based signal processing method provided in embodiments of the present invention. Embodiments of the present invention are only intended to help understand the method and idea of the present invention. It is apparent that those skilled in the art can make various modifications and variations to the invention without departing from the spirit and scope of the invention. To conclude, the contents of the specification should not be construed as limitations to the present invention.

The invention claimed is:

1. An active antenna, comprising an antenna dipole array, a transceiver array, and a digital processing unit (DPU), wherein:

the antenna dipole array comprises an antenna dipole adapted to perform conversion between an electromagnetic wave signal and a radio frequency (RF) signal;

the transceiver array comprises a transceiver adapted to: during signal reception, demodulate the RF signal of the antenna dipole into a first IQ (in-phase and quadrature) analog signal through down-conversion, and output the first IQ analog signal to the DPU; during signal transmission, modulate a second IQ analog signal of the DPU into a second RF signal through up-conversion, and output the second RF signal to the antenna dipole; and the DPU is adapted to: during signal reception, convert the first IQ analog signal into a first IQ digital signal, and perform digital beam forming (DBF) on the first IQ digital signal; during signal transmission, convert a signal of a base band unit (BBU) into a second IQ digital signal through serial/parallel (S/P) conversion, perform crest factor reduction (CFR) on the second IQ digital signal, and perform DBF on the second IQ digital signal that undergoes the CFR processing.

2. The active antenna of claim 1, wherein the DPU comprises:

a receiving calibration algorithm module, adapted to: generate a receiving calibration IQ digital signal; when the receiving calibration IQ digital signal is converted into a receiving calibration IQ analog signal, the receiving calibration IQ analog signal enters a transceiving calibration unit and is modulated into a receiving calibration RF signal through up-conversion, the receiving calibration RF signal enters a selected receiving channel of the transceiver array and is demodulated into an IQ analog calibration signal through down-conversion, and the IQ analog calibration signal is converted into an IQ digital calibration signal, the receiving calibration algorithm module is configured to compare the converted IQ digital calibration signal with the generated receiving calibration IQ digital signal, obtain an amplitude and a phase of the selected receiving channel, and refresh the amplitude and phase of the selected receiving channel; when refreshing amplitudes and phases of all receiving channels, obtain a receiving amplitude and a phase value according to the amplitudes and phases of all the receiving channels, compare the receiving amplitude and the phase value with the amplitude and phase of each receiving channel, and obtain a receiving calibration factor of the amplitude and phase of each receiving channel;

a receiving DBF algorithm module, adapted to configure the receiving calibration factor on a DBF receiving module in each receiving channel;

the DBF receiving module, adapted to perform DBF on the IQ digital calibration signal converted from the down-converted IQ analog calibration signal;

a transmission calibration algorithm module, adapted to: collect the second IQ digital signal that undergoes the DBF processing; when the second IQ digital signal that undergoes the DBF processing is converted into the second IQ analog signal, the second IQ analog signal enters a selected transmission channel of the transceiver array and is modulated into the second RF signal through up-conversion, whereupon the second RF signal is collected by the transceiving calibration unit and demodulated into a transmit IQ analog signal through down-conversion, the transmit IQ analog signal is converted into a transmit IQ digital signal, the transmission calibration algorithm module is further configured to compare the converted transmit IQ digital signal with the collected second IQ digital signal that undergoes the DBF processing, obtain an amplitude and a phase of the selected transmission channel, and refresh the amplitude and phase of the selected transmission channel; when refreshing amplitudes and phases of all transmission channels, obtain a transmission amplitude and a phase value according to the amplitudes and phases of all the transmission channels, compare the transmission amplitude and the phase value with the amplitude and phase of each transmission channel, and obtain a transmission calibration factor of the amplitude and phase of each transmission channel;

a transmission DBF algorithm module, adapted to configure the transmission calibration factor on a DBF transmitting module in each transmission channel; and the DBF transmitting module, adapted to perform DBF on the second IQ digital signal that undergoes CFR processing.

3. The active antenna of claim 2, wherein the transceiving calibration unit comprises:

a receiving calibration channel, connected to the receiving calibration algorithm module at one end through a digital-to-analog converter (DAC) of the DPU and connected to a switch matrix at the other end and adapted to modulate the receiving calibration IQ analog signal into the receiving calibration RF signal through up-conversion when the receiving calibration IQ digital signal generated by the receiving calibration algorithm module is converted into the receiving calibration IQ analog signal through the DAC;

a transmission calibration channel, connected to the transmission calibration algorithm module at one end through an analog-to-digital converter (ADC) of the DPU and connected to the switch matrix at the other end and adapted to demodulate through down-conversion the second RF signal of the transmission channel in the transceiver array into the transmit IQ analog signal; and the switch matrix, connected to the transmission calibration channel and the receiving calibration channel at one end and coupled with front ends of the receiving channel and transmission channel in the transceiver array at the other end through a coupler and adapted to switch the receiving channel and the transmission channel in the transceiver array on a time division basis.

4. The active antenna of claim 2, wherein the transceiving calibration unit comprises a combiner, a duplexer, a receiving calibration channel, and a transmission calibration channel, wherein:

the receiving calibration channel is connected to the receiving calibration algorithm module at one end through a digital-to-analog converter (DAC) of the DPU and connected to the duplexer at the other end and adapted to modulate the receiving calibration IQ analog signal into the receiving calibration RF signal through up-conversion when the receiving calibration IQ digital signal generated by the receiving calibration algorithm module is converted into the receiving calibration IQ analog signal through the DAC;

the transmission calibration channel is connected to the transmission calibration algorithm module at one end through an analog-to-digital converter (ADC) of the DPU and connected to the duplexer at the other end and adapted to demodulate through down-conversion the second RF signal of the transmission channel in the transceiver array into the transmit IQ analog signal; and the combiner is connected to the duplexer at one end and coupled with front ends of the receiving channel and transmission channel in the transceiver array through a coupler and adapted to calibrate the receiving channel and transmission channel in the transceiver array at the same time.

5. The active antenna of claim 1, wherein all receiving channels in the transceiver array share a same receiving local oscillation signal and all transmission channels in the transceiver array share a same transmission local oscillation signal.

6. The active antenna of claim 2, wherein the DBF receiving module and the DBF transmitting module in the DPU are mode-based or carrier-based and adapted to form radiation patterns in different modes or carriers.

7. The active antenna of claim 1, further comprising a power combiner/splitter network connected to at least two antenna dipoles in the antenna dipole array and at least one transceiver in the transceiver array, wherein: during signal reception, the power combiner/splitter network combines weak signals received by the at least two antenna dipoles into one signal and transmits the signal to the at least one transceiver in the transceiver array; during signal transmission, the power combiner/splitter network transmits the second RF signal of at least one transceiver in the transceiver array to the at least two antenna dipoles.

8. The active antenna of claim 1, further comprising a base band unit (BBU) connected to the DPU.

9. The active antenna of claim 1, wherein the antenna dipole is integrated with the receiving channel and transmission channel of the transceiver array connected to the antenna dipole and the receiving channel and transmission channel in the DPU connected to the receiving channel and transmission channel of the transceiver.

10. A method for refreshing an amplitude and a phase of a receiving channel, comprising:
   selecting a receiving channel;
   converting a receiving calibration IQ (in-phase and quadrature) digital signal into an IQ analog signal that enters a receiving calibration channel, and modulating the IQ analog signal into a receiving calibration radio frequency (RF) signal through up-conversion;
   coupling the receiving calibration RF signal into the selected receiving channel, and demodulating the receiving calibration RF signal into an IQ analog signal through down-conversion; converting the IQ analog signal into an IQ digital signal, comparing the IQ digital signal with the receiving calibration IQ digital signal, and obtaining an amplitude and a phase of the selected receiving channel; and
   refreshing the amplitude and phase of the selected receiving channel according to the amplitude and phase.

11. The method of claim 10, further comprising:
   when refreshing amplitudes and phases of all receiving channels, obtaining a receiving amplitude and a phase value according to the amplitudes and phases of all the receiving channels, comparing the receiving amplitude and phase with the amplitude and phase of each receiving channel, and obtaining a receiving calibration factor of the amplitude and phase of each receiving channel; and
   configuring the receiving calibration factor on a digital beam forming (DBF) receiving module in each receiving channel.

12. A method for refreshing an amplitude and a phase of a transmission channel, comprising:
   selecting a transmission channel;
   collecting an IQ (in-phase and quadrature) digital signal;
   converting the IQ digital signal into an IQ analog signal that enters the selected transmission channel, and modulating the IQ analog signal into a radio frequency (RF) signal;
   coupling the RF signal into a transmission calibration channel, and demodulating the RF signal into an IQ analog signal through down-conversion;
   converting the IQ analog signal into an IQ digital signal, comparing the collected IQ digital signal with the converted IQ digital signal, and obtaining an amplitude and a phase of the selected transmission channel; and
   refreshing the amplitude and phase of the selected transmission channel according to the amplitude and phase of the selected transmission channel.

13. The method of claim 12, further comprising: when refreshing amplitudes and phases of all transmission channels, obtaining a transmission amplitude and a phase value according to the amplitudes and phases of all the transmission channels, comparing the transmission amplitude and phase value with the amplitude and phase of each transmission channel, and obtaining a transmission calibration factor of the amplitude and phase of each transmission channel; and
   configuring the transmission calibration factor on a digital beam forming (DBF) transmitting module in each transmission channel.

14. A mode-based or carrier-based processing method for receiving signals, comprising:
   converting IQ (in-phase and quadrature) analog signals of M receiving channels into M IQ digital signals, and splitting each IQ digital signal into N single-mode receiving signals or N single-carrier receiving signals through N mode-based or carrier-based numerical control oscillators (NCOs);
   performing digital beam forming (DBF) on each N single-mode receiving signals or each N single-carrier receiving signals in the M receiving channels;
   combining single-mode receiving signals in the M receiving channels in each N single-mode receive signals or single-carrier receiving signals in the M receiving channels in each N single-carrier receiving signals through a combiner, processing the combined signal through a filter processing module, and obtaining N IQ digital signals; and
   combining the N IQ digital signals into a signal through the combiner, and transmitting the signal to a base band unit (BBU), wherein M is 3 to 20 and N is 1 to 8.

15. A mode-based or carrier-based processing method for transmitting signals, comprising:
   converting a transmission signal through serial/parallel (S/P) conversion, and obtaining N IQ digital signals, processing each IQ (in-phase and quadrature) digital signal of the N IQ digital signals through a mode-based or carrier-based numerical control oscillator (NCO), and obtaining each single-mode transmission IQ digital signal of the N IQ digital signals or each single-carrier transmission IQ digital signal of the N IQ digital signals;
   processing each single-mode transmission IQ digital signal of the N IQ digital signals or each single-carrier transmission IQ digital signal of the N IQ digital signals through M digital beam forming modules (DBFs), and obtaining M mode-based or carrier-based IQ digital signals;
   combining N single-mode transmission IQ digital signals in each M transmission channels or N single-carrier transmission IQ digital signals in each M transmission channels into a signal through a combiner, and obtaining M mode-based or carrier-based mixture transmission signals; and
   performing crest factor reduction (CFR) and digital pre-distortion (DPD) on the M mode-based or carrier-based mixture transmission signals, converting the M mode-based or carrier-based mixture transmission signals into IQ analog signals, and outputting the IQ analog signals to each transmission channel of a transceiver, wherein M is 3 to 20 and N is 1 to 8.

* * * * *

UNITED STATES PATENT AND TRADEMARK OFFICE
CERTIFICATE OF CORRECTION

PATENT NO. : 8,391,377 B2  
APPLICATION NO. : 13/026914  
DATED : March 5, 2013  
INVENTOR(S) : Zhu et al.

Page 1 of 1

It is certified that error appears in the above-identified patent and that said Letters Patent is hereby corrected as shown below:

Title Page, item 75 Inventors, "Zhubiao HE" should read -- Zhuobiao He --.

Signed and Sealed this
Thirtieth Day of April, 2013

Teresa Stanek Rea
*Acting Director of the United States Patent and Trademark Office*